(12) United States Patent
Bakulin et al.

(10) Patent No.: US 12,196,904 B2
(45) Date of Patent: Jan. 14, 2025

(54) ENHANCEMENT OF SEISMIC DATA

(71) Applicants: Saudi Arabian Oil Company, Dhahran (SA); Trofimuk Institute of Petroleum Geology and Geophysics, Novosibirsk (RU)

(72) Inventors: Andrey Bakulin, Dhahran (SA); Dmitry Neklyudov, Novosibirsk (RU); Ilya Silvestrov, Dhahran (SA)

(73) Assignees: Saudi Arabian Oil Company, Dhahran (SA); Trofimuk Institute of Petroleum Geology and Geophysics, Novosibirsk (RU)

( * ) Notice: Subject to any disclaimer, the term of this patent is extended or adjusted under 35 U.S.C. 154(b) by 374 days.

(21) Appl. No.: 17/630,654

(22) PCT Filed: Jul. 31, 2019

(86) PCT No.: PCT/RU2019/000532
§ 371 (c)(1),
(2) Date: Jan. 27, 2022

(87) PCT Pub. No.: WO2021/020982
PCT Pub. Date: Feb. 4, 2021

(65) Prior Publication Data
US 2022/0260742 A1    Aug. 18, 2022

(51) Int. Cl.
*G01V 1/36* (2006.01)
*G01V 1/30* (2006.01)

(52) U.S. Cl.
CPC .............. *G01V 1/362* (2013.01); *G01V 1/307* (2013.01); *G01V 2210/24* (2013.01);
(Continued)

(58) Field of Classification Search
CPC ........ G01V 1/307; G01V 1/362; G01V 1/364; G01V 2210/21; G01V 2210/24;
(Continued)

(56) References Cited

U.S. PATENT DOCUMENTS

| 3,597,727 A | 8/1971 | Judson et al. |
| 3,806,863 A | 4/1974 | Brown et al. |

(Continued)

FOREIGN PATENT DOCUMENTS

| CN | 102109612 | 6/2011 |
| CN | 102478671 | 5/2012 |

(Continued)

OTHER PUBLICATIONS

Mosher, Charles C. "Generalized windowed transforms for seismic processing and imaging." SEG Technical Program Expanded Abstracts 2012, Sep. 2012, https://doi.org/10.1190/segam2012-1196.1. (Year: 2012).*

(Continued)

*Primary Examiner* — Yoshihisa Ishizuka
*Assistant Examiner* — Joshua L Forristall
(74) *Attorney, Agent, or Firm* — Fish & Richardson P.C.

(57) ABSTRACT

Methods, systems, and computer-readable medium to perform operations including: generating a first time-frequency spectrum of a first seismic trace from an original seismic dataset; generating a second time-frequency spectrum of a second seismic trace from an enhanced seismic dataset, where the second seismic trace corresponds to the first seismic trace; and re-combining an amplitude spectrum of the first time-frequency spectrum and a phase spectrum of the second time-frequency spectrum to generate a third time-frequency spectrum of an output trace that corresponds to the first and second seismic traces.

20 Claims, 12 Drawing Sheets

(52) U.S. Cl.
CPC .... *G01V 2210/322* (2013.01); *G01V 2210/34* (2013.01); *G01V 2210/43* (2013.01)

(58) Field of Classification Search
CPC ....... G01V 2210/322; G01V 2210/324; G01V 2210/34; G01V 2210/43
USPC .......................................................... 702/14
See application file for complete search history.

(56) References Cited

U.S. PATENT DOCUMENTS

| | | | |
|---|---|---|---|
| 5,850,622 | A | 12/1998 | Vassiliou et al. |
| 6,161,076 | A | 12/2000 | Barr et al. |
| 6,876,599 | B1 | 4/2005 | Combee |
| 6,904,368 | B2 | 6/2005 | Reshef et al. |
| 7,379,386 | B2 | 5/2008 | Muyzert et al. |
| 7,453,764 | B2 | 11/2008 | Cavalca et al. |
| 9,470,811 | B2 | 10/2016 | Sun et al. |
| 10,947,789 | B1 | 3/2021 | Al-Abdulrahman et al. |
| 2003/0055567 | A1 | 3/2003 | Kelly |
| 2004/0233782 | A1 | 11/2004 | Herkenhoff et al. |
| 2005/0075790 | A1* | 4/2005 | Taner ...................... G01V 1/306 702/14 |
| 2005/0090989 | A1 | 4/2005 | Kelly |
| 2007/0055465 | A1* | 3/2007 | Lecerf ..................... G01V 1/366 702/66 |
| 2008/0049551 | A1 | 2/2008 | Muyzert et al. |
| 2009/0276159 | A1* | 11/2009 | Strobbia ................ G01V 1/364 702/17 |
| 2010/0027376 | A1 | 2/2010 | Washbourne et al. |
| 2011/0013481 | A1 | 1/2011 | Clark |
| 2011/0295510 | A1* | 12/2011 | Gulati ..................... G01V 1/288 345/419 |
| 2017/0269246 | A1 | 9/2017 | Anderson et al. |
| 2020/0264327 | A1 | 8/2020 | Gadylshin et al. |
| 2020/0400847 | A1 | 12/2020 | Bakulin et al. |
| 2023/0266492 | A1 | 8/2023 | Bakulin et al. |

FOREIGN PATENT DOCUMENTS

| | | |
|---|---|---|
| CN | 102854530 | 1/2013 |
| CN | 104268412 | 1/2015 |
| CN | 105388519 | 3/2016 |
| CN | 106443787 | 2/2017 |
| CN | 106646613 | 5/2017 |
| CN | 106842297 | 6/2017 |
| CN | 107340541 | 11/2017 |
| EP | 2762926 | 8/2014 |
| WO | WO 2005017564 | 2/2005 |
| WO | WO 2011034870 | 3/2011 |
| WO | WO 2013190512 | 12/2013 |
| WO | WO 2019156586 | 8/2019 |
| WO | WO 2021020982 | 2/2021 |
| WO | WO 2021020983 | 2/2021 |
| WO | WO 2021020984 | 2/2021 |

OTHER PUBLICATIONS

U.S. Appl. No. 17/595,365, Bakulin et al., Nov. 15, 2021.
U.S. Appl. No. 17/630,663, Bakulin et al., Jan. 27, 2022.
U.S. Appl. No. 17/630,665, Bakulin et al., Jan. 27, 2022.
Alsteris et al., "Short-time phase spectrum in speech processing: a review and some experimental results," Digital Signal Processing, 2007, 17:578-616, 39 pages.
Bakulin et al., "Application of supergrouping to enhance 3D prestack seismic data from a desert environment," The Leading Edge, Mar. 2018, 201-207, 8 pages.
Bakulin et al., "Application of supergrouping to land seismic data in desert environment," SEG International Exposition and 86th Annual Meeting, 2016, 5 pages.
Bakulin et al., "Nonlinear beaforming for enhancing prestack seismic data with a challenging near surface or overburden," Data Processing & Machine Learning, Dec. 2018, 6 pages.
Bakulin et al., "Nonlinear beamforming for enhancing pre-stack data with challenging near surface or overburden," SEG Technical Program Expanded Abstracts, Aug. 2017, 5 pages.
Baykulov et al., "Prestack seismic data enhancement with partial common-reflection-surface (CRS) stack," Geophysics, May-Jun. 2009, 74(3):49-58, 10 pages.
Berkovitch et al., "How non-hyperbolic MultiFocusing improves depth imaging," First Break, Sep. 2011, 29:95-103, 9 pages.
Billete et al., "Practical aspects and applications of 2D stereotomography," Geophysics, May 2003, 68(3):1008-1021, 14 pages.
Bishop et al., "Tomographic determination of velocity and depth in laterally varying media," Geophysics, Jun. 1985, 50(6):903-923, 22 pages.
Buzlukov et al., "Imaging improvement by prestack signal enhancement," Geophysical Prospecting, 2013, 61:1150-1158, 9 pages.
Buzlukov et al., "Prestack data enhancement using local traveltime approximation," 72nd EAGE Conference & Exhibition incorporating EUROPEC, Barcelona, Spain, Jun. 14-17, 2010, 5 pages.
Curia et al., "The impact of multifocusing in the processing of land 3D seismic data in a fold and thrust belt setting: Ranquil Norte Block, Neuquén Basin, Argentina," The Leading Edge, 2013, 36(9):770-774, 5 pages.
Digital Signal Processing, Blackledget, Horwood Publishing, 2006, 2nd ed., 840 pages.
Duveneck, "Tomographic determination of seismic velocity models with kinematic wavefield attributes," Zur Erlangung des akademischen Grades eines, Doktors De Naturwissenschaften von der Fakultat fur Physik der Universitat Karlsruhe (TH) genehmigte, DISSERTATION von Dipl.-Geophys., Jun. 2004, 201 pages.
Duveneck, "Tomographic velocity model estimation with data-derived first and second travel time derivatives," presented at the 8th International Congress of the Brazilian Geophysical Society, Brazil, Sep. 14-18, 2003, 4 pages.
Duveneck, "Velocity model estimation with data-derived wavefront attributes," Geophysics, Jan. 2004, 69(1):265-274, 10 pages.
Erdogan et al., "Phase-sensitive and recognition-boosted speech separation using deep recurrent neural networks," Proc. Int. Conf. Acoust., Speech, Signal Process., 2015, 708-712, 5 pages.
Fagin, "Model based depth imaging," Society of Exploration Geophysics, Course Notes Series No. 10, Tulsa, USA, 1999, 184 pages.
Gjoystdal et al., "Inversion of reflection times in three dimensions," Geophysics, Jul. 1981, 46(7):972-983, 12 pages.
Hoecht et al., "Operator-oriented CRS interpolation," Geophysical Prospecting, 2009, 57:957-979, 23 pages.
Hubral et al., "Interval Velocities from Seismic Reflection Time Measurements," Society of Exploration Geophysicists, 1980, 214 pages.
Jones, "Estimating subsurface parameter fields for seismic migration: Velocity model building," Seismic velocity/statics, Oct. 2015, 24 pages.
Khaidukov et al., "Enhancement of seismic data gathered by floating ice acquisition: application of local kinematic attributes," SEG International Exposition and 86th Annual Meeting, 2016, 5 pages.
Klüver, "Velocity model building using migration to residual time," SEG Technical Program Expanded Abstracts, SEG/New Orleans 2006 Annual Meeting, 5 pages.
Lambaré et al., "Multi-layer non-linear slope tomography," 75th Annual International Conference and Exhibition, EAGE, Extended Abstracts, London, Jun. 10-13, 2013, 5 pages.
Lambaré, "Stereotomography," Geophysics, Sep. 2008, 73(5):VE25-VE34, 10 pages.
Lavaud et al., "Automatic robust velocity estimation by poststack stereotomography," SEG Technical Program Expanded Abstracts 2004, SEG International Exposition and 74th Annual Meeting, Oct. 10-15, 2004, 4 pages.
Li et al., "A low rank approximation method for ice-break noise attenuation of simultaneous vibroseis data," SEG Technical Program Expanded Abstracts, Aug. 2017, 5 pages.
Liang et al., The optimal ratio time-frequency mask for speech separation in terms of the signal-to-noise ratio, The Journal of the Acoustical Society of America, 2013, 134(5):EL452, 8 pages.

(56) References Cited

OTHER PUBLICATIONS

Lichman et al., "Automated Phase-based Moveout Correction," 69th SEG Annual International Meeting, Expanded Abstracts, 2000, 5 pages.

Lichman et al., "Phase Inversion Deconvolution for Surface Consistent Processing and Multiple Attenuation," SEG Annual International Meeting, Expanded Abstracts, 1999, 4 pages.

Martin et al., "Noise Power Spectral Density Estimation Based on Optimal Smoothing and Minimum Statistics," IEEE Transactions on Speech and Audio Processing, Jul. 2001, 9(5):504-512, 9 pp. 512.

Mueller et al., "Improving Prestack Migration with CRS Techniques—a Case Study," 72nd EAGE Conference and Exhibition, Expanded Abstract, Jun. 2010, 5 pages.

Neckludov et al., "Residual stereotomographic inversion," Geophysics, Jul. 2006, 71(4):E35-E39, 6 pages.

Neklyudov et al., "Intra-array statics and phase corrections obtained by beamforming in the short-time fourier transform domain: application to supergrouping," SEG International Exposition, 2017, 6 pages.

Robinson et al., "Geophysical signal analysis," Society of Exploration Geophysicists, 2000, 481 pages.

Tanushev et al., "Fast, high-resolution beam tomography and velocity-model building," The Leading Edge, Feb. 2017, 36(2):140-145, 6 pages.

Ulrych et al., "The essence of phase in seismic data processing and inversion," 77th SEG Annual Meeting, Expanded Abstracts, 2007, 1765-1769, 5 pages.

Van Der Made et al., "Estimation of complex velocity models from stacking information," SEG Technical program Expanded Abstracts, 1987, 3 pages.

Wang et al., "Time-frequency masking for speech separation and its potential for hearing aid design," Trends in Amplificat., 2008, 12:332-353, 22 pages.

Wikipedia.com [online], "Median filter," Last edited Sep. 10, 2021 retrieved Apr. 8, 2022, retrieved from URL <https://en.wikipedia.org/wiki/Median_filter>, 4 pages.

Williamson et al., "Time-Frequency Masking in the Complex Domain for Speech Dereverberation and Denoising," IEEE/ACM Transactions on Audio, Speech and Language Processing, May 2016, 13(9):1-10, 10 pages.

Woodward et al., "A decade of tomography," Geophysics, Sep.-Oct. 2008, 73(5), 7 pages.

Yilmaz et al., "Blind separation of speech mixtures via time-frequency masking," IEEE Trans. Signal Process, Jul. 2004, 52(7):1830-1846, 19 pages.

Zhang et al., "Common-reflection-surface (CRS) stack for common offset," Geophysical Prospecting, 2001, 49:709-18, 10 pages.

PCT International Search Report and Written Opinion in International Appln. No. PCT/RU2019/000336, dated Feb. 26, 2020, 14 pages.

PCT International Search Report and Written Opinion in International Appln. No. PCT/RU2018/000079, dated Dec. 6, 2018, 12 pages.

PCT International Search Report and Written Opinion in International Appln. No. PCT/RU2019/00532, dated Apr. 3, 2020, 17 pages.

PCT International Search Report and Written Opinion in International Appln. No. PCT/RU2019/000534, dated Apr. 3, 2020, 17 pages.

PCT International Search Report and Written Opinion in International Appln. No. PCT/RU2019/000533, dated Apr. 8, 2020, 13 pages.

Bakulin et al., "3D data-domain reflection tomography for intial velocity model building using challenging 3D seismic data," Journal of Seismic Exploration, 2021, 30:419-446, 28 pages.

Stork, "Reflection tomography in the postmigrated domain," Geophysics, May 1992, 57(5):680-692, 13 pages.

RU Office Action in Russian Appln. No. 2021135462, dated Sep. 20, 2022, 12 pages, with English Translation.

RU Office Action in Russian Appln. No. 2022103676, dated Jan. 18, 2023, 10 pages, with English Translation.

RU Office Action in Russian Appln. No. 2022104308, dated Jan. 12, 2023, 11 pages, with English Translation.

RU Office Action in Russian Appln. No. 2022104454, dated Jan. 16, 2023, 10 pages, with English Translation.

Bakulin et al., "3D Prestack Land Data Enhancement Based on Nonlinear Beamforming in Cross-Spread Domain," EAGE 81st Annual Conference and Exhibition, Jun. 6, 2019, 5 pages.

Bakulin et al., "Bootstrapping invisible signals: prestack land data enhancement using nonlinear beamforming with local waveform corrections," SEG Expanded Abstracts, 2019, 3954-3958, 5 pages.

Bakulin et al., "Enhance—Estimate—Image: new processing approach for single-sensor and other seismic data with low pre-stack signal-to-noise ratio," SEG Technical Program Expanded Abstracts, Aug. 17, 2017, 5 pages.

Bakulin et al., "Nonlinear beamforming for enhancement of 3D prestack land seismic data," Geophysics, May 2020, 85(3):V283-V296, 14 pages.

Bakulin et al., "Prestack data enhancement with phase corrections in time-frequency domain guided by local multidimensional stacking," Geophysical Prospecting, May 15, 2020, 68(6):1811-1818, 8 pages.

Billette et al., "Practical aspects and applications of 2D stereotomography," Geophysics, May-Jun. 2003, 68(3):1008-1021, 14 pages.

Gadylshin et al., "Inpainting of local wavefront attributes using artificial intelligence," SEG Technical Program Expanded Abstracts, Aug. 1, 2019, 2212-2216, 5 pages.

Neckludov et al., "Residual stereotomographic inversion," Geophysics, Jul.-Aug. 2006, 71(4): E35-E39, 5 pages.

Özbek et al., "3-D filter design on a hexagonal grid with applications to point-receiver land acquisition," SEG Int'l Exposition and 74th Annual Meeting, Oct. 10-15, 2004, 5 pages.

PCT International Search Report and Written Opinion in International Appln. No. PCT/RU2020/000469, dated May 28, 2021, 18 pages.

RU Office Action in Russian Appln. No. 2023106594, dated Nov. 30, 2023, 17 pages, with English Translation.

SAIP Examination Report in SAIP Appln. No. 521430857, dated Dec. 22, 2023, 11 pages with English translation.

SAIP Examination Report in SAIP Appln. No. 522431566, dated Dec. 27, 2023, 15 pages.

\* cited by examiner

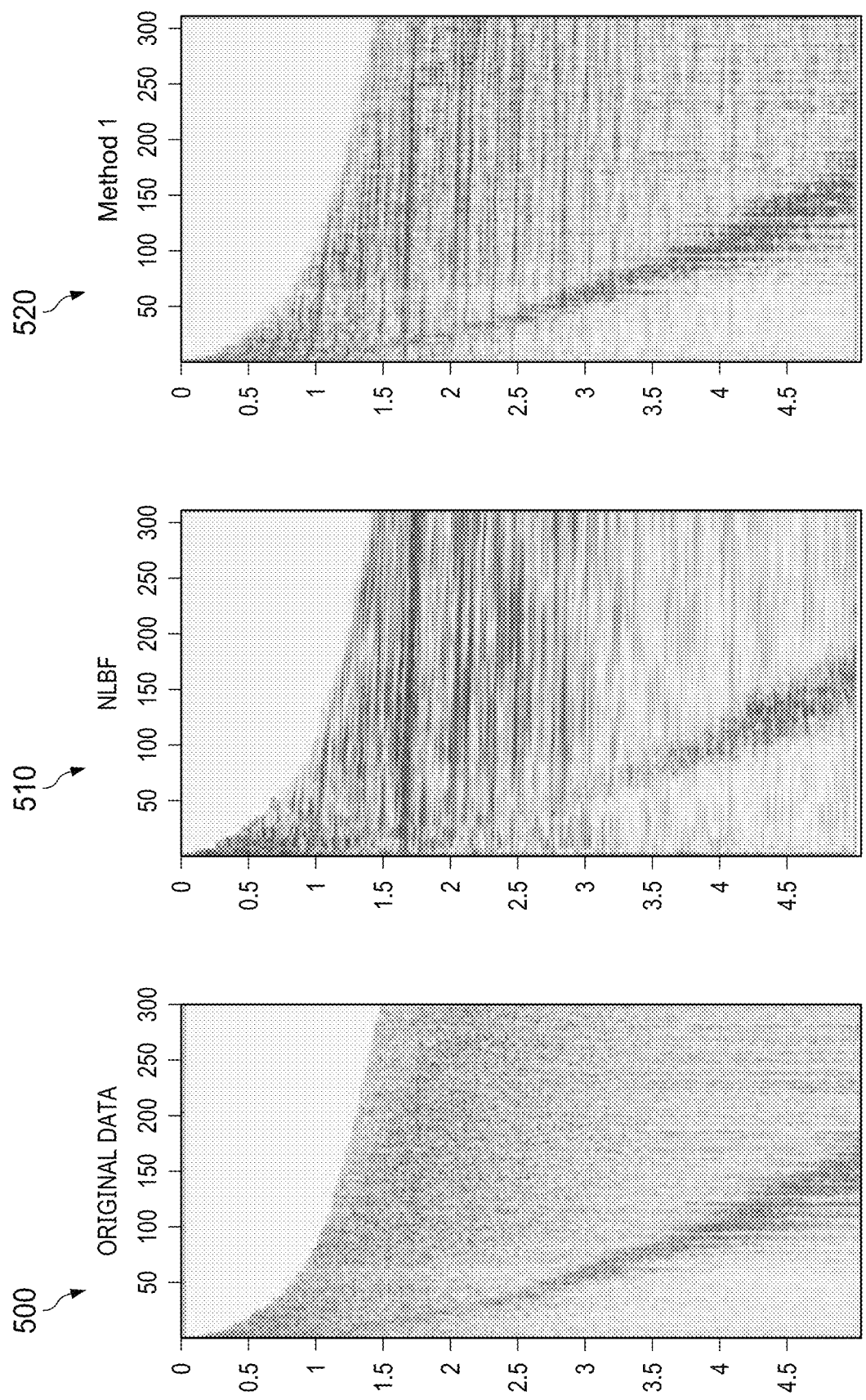

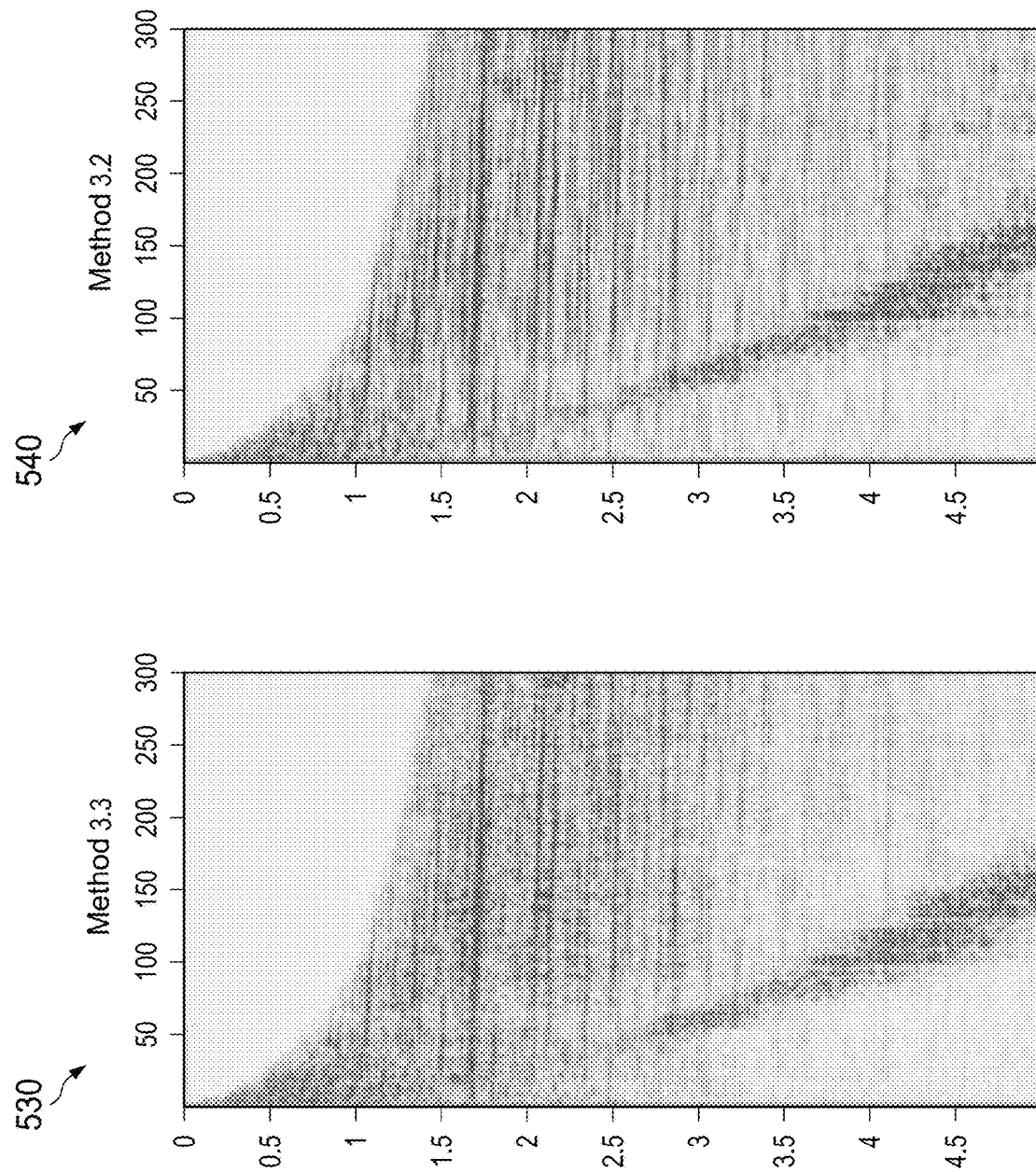

ENHANCEMENT OF SEISMIC DATA

CROSS-REFERENCE TO RELATED APPLICATION(S)

This application is a U.S. National Phase Application under 35 U.S.C. § 371 and claims the benefit of priority to International Application Serial No. PCT/RU2019/000532, filed Jul. 31, 2019, the contents of which are hereby incorporated by reference.

TECHNICAL FIELD

This disclosure relates to exploration seismology and, more specifically, to seismic data processing.

BACKGROUND

Seismic data is obtained from seismic surveys to image geological structures of a subterranean region. In particular, seismic data is used to identify geologic structural and stratigraphic features, such as subsurface faults and unconformities. Poststack seismic data can include two-dimensional (2D) seismic slices or three-dimensional (3D) seismic volumes. Prestack seismic data can have higher dimensions, including source and receiver positions arranged in orthogonal directions.

SUMMARY

The present disclosure describes seismic processing methods for preserving high-frequency content in seismic data that has undergone signal-to-noise ratio (SNR) enhancement. SNR enhancement procedures, such as non-linear beamforming (NLBF) and supergrouping (SG), perform local stacking of prestack seismic data that includes weak or indecipherable seismic signals. While SNR enhancement procedures improve prestack data, it does so at the expense of damaging higher frequencies in the seismic data. Damaging higher frequencies in the seismic data reduces the frequency band of the prestack data and leads to loss of vertical resolution in the prestack data.

Aspects of the subject matter described in this specification may be embodied in methods that include the actions of: generating a first time-frequency spectrum of a first seismic trace from an original seismic dataset; generating a second time-frequency spectrum of a second seismic trace from an enhanced seismic dataset, where the second seismic trace corresponds to the first seismic trace; and re-combining an amplitude spectrum of the first time-frequency spectrum and a phase spectrum of the second time-frequency spectrum to generate a third time-frequency spectrum of an output trace that corresponds to the first and second seismic traces.

The previously-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium. These and other embodiments may each optionally include one or more of the following features.

In a first aspect, generating a time-based output trace from the third time-frequency spectrum.

In a second aspect, where generating the first time-frequency spectrum includes using short-term Fourier transform (STFT) to generate the first time-frequency spectrum, and wherein generating the time-based output trace includes using inverse short-term Fourier transform (ISTFT) to generate the time-based output trace.

In a third aspect, where the enhanced seismic dataset is generated by performing a signal-to-noise ratio (SNR) enhancement procedure on the original seismic dataset.

In a fourth aspect, where the SNR enhancement procedure includes: common-reflection surface method (CRS), multi-focusing (MF), supergrouping, or non-linear beamforming.

In a fifth aspect, where the enhanced seismic dataset has an identical acquisition geometry to the original seismic dataset, and where the second seismic trace is located in the same position in the enhanced seismic dataset as the first seismic trace in the original seismic dataset.

In a sixth aspect, where the original seismic dataset includes a plurality of seismic traces, and for each seismic trace of the plurality, generating a respective output trace corresponding to the seismic trace, where the respective output traces collectively form an output seismic dataset.

The subject matter described in this disclosure can be implemented to realize one or more of the following advantages. The described subject matter can achieve a wider frequency band (particularly in the higher-frequency region) for prestack seismic data that has undergone SNR enhancement. Maintaining high frequency content in seismic data allows for more resolved seismic images (in time or depth) and detection of finer structures in the subsurface than is possible by seismic data in which the high frequency content is suppressed. Furthermore, the described subject matter is computationally effective, and thus, may be used to process modern high-channel count seismic datasets. Other advantages will be apparent to those of ordinary skill in the art.

The details of one or more implementations of the subject matter of this disclosure are set forth in the description, the claims, and the accompanying drawings. Other features, aspects, and advantages of the subject matter will become apparent from the description, the claims, and the accompanying drawings.

BRIEF DESCRIPTION OF THE DRAWINGS

FIGS. 5A, 5B, 5C, 5D, and 5E illustrate examples of seismic processing methods applied to a seismic dataset, according to some implementations of the present disclosure.

Like reference numbers and designations in the various drawings indicate like elements.

DETAILED DESCRIPTION

Figure 1:
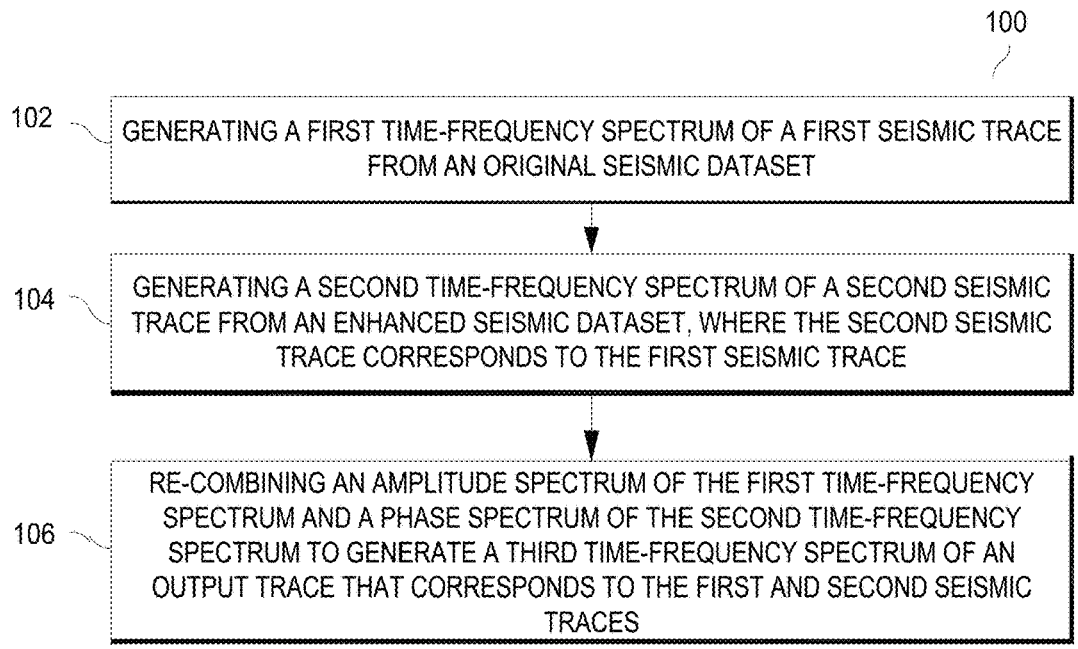
FIG. 1 is a flowchart of a first example seismic processing method, according to some implementations of the present disclosure.

The following detailed description describes methods and systems for preserving high-frequency content in prestack seismic data that has undergone signal-to-noise ratio (SNR) enhancement. Various modifications, alterations, and permutations of the disclosed implementations can be made and will be readily apparent to those of ordinary skill in the art. Further, the general principles defined may be applied to other implementations and applications, without departing from the scope of the disclosure. In some instances, details unnecessary to obtain an understanding of the described subject matter may be omitted so as to not obscure one or more described implementations with unnecessary detail since such details are within the skill of one of ordinary skill in the art. The present disclosure is not intended to be limited to the described or illustrated implementations. Furthermore, the present disclosure is to be accorded the widest scope consistent with the described principles and features.

I. Overview

Traditionally, land seismic data acquisitions have been performed with field arrays that include a number of geophones on the order of high 10s to low 100s (for example, 72 geophones or more). In recent practice, however, many land seismic data acquisitions are performed with small field arrays (that is, smaller than traditional field arrays) that include a number of geophones-per-channel on the order of low 10s or even in the single digits (for example, 15 geophones or less).

However, using smaller field arrays is detrimental to the SNR of the seismic datasets that is acquired by the smaller field arrays. Additionally, processing prestack data in these seismic datasets is challenging because the signals (for example, reflections) are masked by noise. For instance, it is challenging and unreliable to apply conventional time processing algorithms to this prestack data because the derived processing parameters are based on noise. In order to improve the reliability and utility of seismic datasets that are acquired by small field arrays, the noise in the prestack data needs to be suppressed and the signals need to be enhanced.

Several existing enhancement procedures are used to enhance prestack data. These procedures, which are generally referred to as SNR enhancement procedures, include multi-dimensional data-driven stacking techniques, such as the common-reflection surface method (CRS) and multi-focusing (MF). These techniques have also been adopted for two-dimensional (2D) and three-dimensional (3D) cases in a procedure called non-linear beamforming (NLBF). The common feature amongst these procedures is the local stacking of coherent signals registered by neighboring traces. To obtain reliable signals from noisy data, SNR enhancement procedures require large stacking apertures that can reach hundreds of meters. Furthermore, the procedures require several hundred (or even thousands) of traces to produce an output trace with an increased SNR that is acceptable for processing.

Individual traces within such large sets are usually recorded under different near-surface conditions. As a result, the traces have moderate or severe local waveform variations. Consequently, the enhanced data (that is, the output of the SNR enhancement procedures) suffers from suboptimal stacking, which results in the suppression of high-frequency content of the signals within the traces. The suppression of high-frequency content is an undesirable side effect of multi-channel data enhancement procedures. Maintaining high-frequency content in seismic data is important for producing more resolved seismic images (in time or depth) and detecting finer structures in the subsurface.

This disclosure describes seismic processing methods for preserving high-frequency content in seismic data that has undergone SNR enhancement. In this disclosure, "original" seismic data that has undergone SNR enhancement is also referred to as "enhanced" data or enhanced traces. Furthermore, for typical surface broadband seismic acquisition, when the sweep signal of sources varies in the interval 2-120 Hertz (Hz), "high-frequency" means a range of frequencies of ~40-120 Hz.

In an embodiment, the disclosed seismic processing methods use the original and enhanced traces as building blocks to construct output traces that preserve high-frequency content. Since seismic traces are non-stationary, the original and enhanced traces are decomposed into the time-frequency (TF) domain using short-time Fourier transform (STFT). In the TF domain, the output traces are constructed using the TF spectra of the original and enhanced traces. Once generated in the TF domain, the output traces are synthesized into the time domain using inverse short-time Fourier transform (ISTFT).

II. Methods and Systems for Preserving High-Frequency Content in Seismic Data that has Undergone SNR Enhancement The disclosed seismic processing methods serve as an extension of SNR enhancement procedures. Specifically, the disclosed seismic processing methods can be applied after an enhanced dataset is generated using an SNR enhancement procedure. The process of generating an output dataset that improves the SNR of the original dataset and that preserves high-frequency content is a two-step process. In the first step, an SNR enhancement procedure generates an enhanced seismic dataset that improves the SNR of the original dataset. In the second step, one of the disclosed seismic processing methods uses the original and enhanced datasets to construct the output dataset that effectively restores the high-frequency content lost during the SNR enhancement procedure.

For the purposes of this disclosure, the following assumptions are made about the original and enhanced datasets. First, the original dataset has passed through a standard seismic signal processing workflow that includes processes such as noise removal, static correction, and deconvolution. Second, the enhanced dataset has improved SNR in comparison to the original dataset. Third, the high-frequency content of the enhanced dataset is suppressed because of suboptimal stacking during the SNR enhancement procedure. Fourth, the enhanced dataset retains the same acquisition geometry as the original dataset (that is, the seismic traces in the enhanced dataset are located in the same positions as in the original dataset). As such, a j-th trace in the original dataset corresponds to a j-th trace in the enhanced dataset, where the j-th enhanced trace is an SNR enhanced version of the j-th original trace.

In the first step of generating the output dataset, an SNR enhancement procedure generates the enhanced dataset based on the original dataset. In this process, weak reflections in the seismic data are identified and interpreted to generate an enhanced dataset. In particular, the enhanced dataset is constructed using local traveltime information about desired arrivals. Each trace of the enhanced dataset is constructed by stacking of neighboring traces of original (noisy) dataset along specifically determined trajectories within predefined apertures. These trajectories describe time delays of corresponding arrivals of reflected waves in some vicinity of an enhanced trace. This is considered delay-and-sum beamforming. Details of SNR enhancement procedures are disclosed in PCT/RU2018/000079, titled "Systems and Methods to Enhance 3-D Prestack Seismic Data Based on Non-Linear Beamforming in the Cross-Spread Domain," which is incorporated by reference.

Generally, the SNR enhancement procedure suppresses a noise component in the original dataset to generate the enhanced dataset, thereby improving the SNR. As such, the original dataset can be defined as the sum of the enhanced dataset and the suppressed noise component:

$$x_j(t)=s_j(t)+n_j(t). \quad (1)$$

In equation (1), $x_j(t)$ is a j-th trace from the original dataset (also referred to as Trace1), $s_j(t)$ is a corresponding j-th trace from the enhanced dataset (also referred to as Trace2), and $n_j(t)$ is a "noise" component of Trace1 that has been suppressed by the SNR enhancement procedure (that is, the j-th noise component in the original dataset).

From equation (1), the noise component of Trace1 is defined as shown in equation (2):

$$n_j(t)=x_j(t)-s_j(t). \quad (2)$$

The term $n_j(t)$ includes both random and coherent noise that has been suppressed in $s_j(t)$ by the SNR enhancement procedure. However, due to suboptimal stacking during the SNR enhancement procedure, $n_j(t)$ also includes a residual component of the signal (from the original trace) that has been suppressed by the SNR enhancement procedure. Accordingly, $n_j(t)$ is also defined as the sum of the actual noise component and the suppressed residual component of the signal:

$$n_j(t)=\hat{n}_j(t)+\delta s_j(t). \quad (3)$$

In equation (3), $\hat{n}_j(t)$ is the j-th actual noise component and $\delta s_j(t)$ is the suppressed residual component of the j-th signal.

In order to improve the enhanced dataset, the suppressed residual component of the signal needs to be accounted for. The desired output dataset can be defined as the sum of the enhanced dataset and the suppressed residual components:

$$\hat{s}_j(t)=s_j(t)+\delta s_j(t). \quad (4)$$

In equation (4), $\hat{s}_j(t)$ is the j-th desired output trace and is defined as the sum of the j-th trace from the enhanced dataset and the j-th suppressed residual component. Because $\hat{s}_j(t)$ includes the suppressed residual component, $\hat{s}_j(t)$ has a wider frequency band (particularly in the high-frequency region) than $s_j(t)$.

To gain further insight on the datasets, the datasets are analyzed in the frequency domain. In the frequency domain, a seismic trace is described in terms of amplitudes and phases at certain frequencies. In particular, a seismic trace is represented using equation (5):

$$X_j(w)=|X_j(w)|e^{i\varphi(w)}. \quad (5)$$

In equation (5), the amplitude spectrum $|X_j(w)|$ and the phase spectrum $\varphi(w)$ taken together uniquely describe the time signature of the seismic trace. Additionally, in equation (5), the arrival time information is encoded in the phase spectrum. Therefore, if the phase spectrum remains intact, the seismic trace can be accurately reconstructed in terms of the positions where the seismic trace should be located in time (even if the amplitude spectrum is perturbed).

Because the enhanced dataset is constructed using local traveltime information about desired arrivals, it can be assumed that the phase spectra of the enhanced dataset is an adequate estimate of the phase spectra of the desired signals (if the stacking apertures have been reasonably selected). This assumption can be made because it is known in the practice of seismic exploration that the arrival time of desired waves is contained in the phase spectrum of a seismic trace. Therefore, it is expected that positions/traveltimes of reflected events (for example, those that are encoded in the phase part of the spectra) and waveforms are correctly estimated (if the stacking apertures have been reasonably selected). Stacking apertures are reasonably selected by taking into account a tradeoff between signal-to-noise ratio improvement and over smoothing of output data after enhancement. Usually, aperture widths vary in the range of tens to several hundred meters (for example, on the order of 50-500 meters). The use of too large stacking apertures may distort the waveform of reflected arrivals.

Although the phase spectra of the enhanced dataset is an adequate estimate of the phase spectra of the desired signals, the enhanced dataset suppresses residual components of the signal (for example, high-frequency components). The suppression is presented in the amplitude spectrum of the enhanced dataset.

In an embodiment, the disclosed seismic processing methods generate an output trace by re-combining an amplitude spectrum of an original trace with the phase spectrum of a corresponding enhanced trace. To account for the non-stationary nature of seismic signals (that is, that the statistical properties of seismic signals vary with time), the seismic traces are decomposed into the TF domain using discrete short-time Fourier Transform (STFT). STFT is a Fourier-related transform used to determine frequency content of local segments of a signal as it changes over time. Computing the STFT involves dividing a longer time signal into shorter overlapping intervals of equal length and then separately computing the Fourier transform for each interval. As such, a respective Fourier spectrum is obtained on each time interval of the signal. Continuous STFT of a time dependent function, $x(t)$, is given by:

$$\text{STFT}\langle x(t)\rangle \equiv X(\tau,v) = \int_{-\infty}^{\infty} x(t)W(t-\tau)e^{(-i*2\pi v*t)}dt. \quad (6)$$

In equation (6), $W(t)$ is a real and symmetric window function, $v$ is frequency, and $\tau$ is a "time frame" or time of the center of the time window used in the STFT. Using equation (6), an STFT real-valued time dependent function (for example, a seismic trace) is transformed into a complex-valued matrix with one dimension representing the frequency and the other dimension representing the time-frame axis. The STFT is also invertible. That is, the original signal can be recovered from the transform using a procedure called Inverse STFT (ISTFT). To perform the inversion, adjacent sliding time windows overlap with one another by at least half of their length.

In order to use the original and enhanced datasets to construct the output dataset, the original and enhanced datasets are first transformed into the TF domain. For example, to transform Trace1 (the j-th original trace) and Trace2 (the corresponding j-th enhanced trace), STFT is applied to Trace1 and Trace2. The following complex-valued TF spectra are obtained:

$$X_j(k,l) = STFT\langle Trace1 \rangle, \quad (7.1)$$

$$S_j(k,l) = STFT\langle Trace2 \rangle, \quad (7.2)$$

$$N_j(k,l) = X_j(k,l) - S_j(k,l). \quad (7.3)$$

In these equations, k is the discrete frequency bin, and l is the frame indices. Equation (7.1) represents the TF spectrum of the j-th original trace; equation (7.2) represents the TF spectrum of the corresponding j-th enhanced trace; and equation (7.3) represents the TF spectrum of the j-th noise component.

Using equation (5), the TF spectra (7.1) and (7.2) can also be represented as:

$$X_j(k,l) = |X_j(k,l)| e^{i\varphi_X(k,l)}, \quad (8)$$

$$S_j(k,l) = |S_j(k,l)| e^{i\varphi_S(k,l)}. \quad (9)$$

In equations (8) and (9), $|X_j(k,l)|$ is the amplitude spectrum of the j-th original trace, $\varphi_X$ is the phase spectrum of the j-th original trace, $|S_j(k,l)|$ is the amplitude spectrum of the corresponding j-th enhanced trace, and cps is the phase spectrum of the corresponding j-th enhanced trace.

a. Method 1

In an embodiment, the first seismic processing method ("Method 1") constructs a TF spectrum of an output trace by combining the amplitude spectrum of an original trace with the phase spectrum of a corresponding enhanced trace. Using the TF spectra equations (8) and (9), the TF spectrum of the output trace is defined as:

$$\hat{S}_j(k,l) = |X_j(k,l)| e^{i\varphi_S(k,l)}. \quad (10)$$

As shown by equation (10), the TF spectrum of the j-th output trace, $\hat{S}_j(k,l)$, is constructed by re-combining the amplitude spectrum of the j-th original trace, $|X_j(k,l)|$, with the phase spectrum of the corresponding j-th enhanced trace, $\varphi_s(k,l)$. Once the TF spectrum of the output trace is generated, ISTFT can be used to obtain the time-domain output trace:

$$\hat{s}_j(t) = ISTFT\langle \hat{S}_j(k,l) \rangle. \quad (11)$$

In equation (11), $\hat{s}_j(t)$ is the time domain output trace.

FIG. 1 is a flow chart of an example method 100 for constructing an output trace, according to some implementations. For clarity of presentation, the description that follows generally describes method 100 in the context of the other figures in this description. For example, method 100 can be performed by a computer system described in FIG. 10. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At step 102, method 100 involves generating a first time-frequency spectrum of a first seismic trace from an original seismic dataset. The original seismic dataset is a dataset of seismic traces that has been obtained by performing a seismic survey (for example, seismic survey illustrated in FIG. 9). In some examples, the original seismic dataset has passed through a standard seismic signal processing workflow that includes processes such as noise removal, static correction, and deconvolution. Therefore, the original seismic dataset is ready for velocity analysis and imaging. In an example, generating the first time-frequency spectrum is performed using short-time Fourier transform (STFT).

At step 104, method 100 generating a second time-frequency spectrum of a second seismic trace from an enhanced seismic dataset, where the second seismic trace corresponds to the first seismic trace. In an implementation, the enhanced dataset is generated by applying an SNR enhancement procedure to the original seismic dataset. The enhanced dataset retains the same acquisition geometry as the original dataset. Therefore, the second seismic trace, which corresponds to the first seismic signal, is located at the same position in the enhanced dataset as the position of the first seismic trace in the original seismic dataset. Furthermore, the enhanced dataset has improved SNR in comparison to the original dataset. However, the high-frequency content of the enhanced dataset is suppressed due to sub-optimal stacking during the SNR enhancement procedure.

At step 106, method 100 involves re-combining an amplitude spectrum of the first time-frequency spectrum and a phase spectrum of the second time-frequency spectrum to generate a third time-frequency spectrum of an output trace that corresponds to the first and second seismic traces. The amplitude spectrum of the third time-frequency spectrum includes higher frequencies than the amplitude spectrum of the second time-frequency spectrum. Additionally, the frequency band of the output trace is wider than the frequency band of the enhanced trace.

In an implementation, once step 106 is completed, method 100 involves repeating steps 102-106 for one or more other traces of the original dataset. The output traces are then arranged together to form an output dataset. The amplitude spectra of the output dataset includes higher frequencies than the amplitude spectra of the enhanced dataset. Additionally, the frequency band of the output dataset is wider than the frequency band of the enhanced dataset. Furthermore, the output dataset preserves the SNR enhancement found in the enhanced dataset. Thus, the output dataset combines the wide frequency band of the original dataset with the SNR enhancement of the enhanced dataset.

Furthermore, in some implementations, method 100 involves performing ISTFT on the TF spectrum of the output trace to generate a time domain version of the output trace. The ISTFT can be performed on each output trace individually once the trace is generated or can be performed on the output traces once the output dataset is generated.

In Method 1, the frequency content of the signals is preserved. However, the amplitude spectra from the original traces are passed essentially untouched to the output traces. As a result, in the presence of strong noise, distortion by noise in the amplitude spectra remains uncorrected in the output traces. Furthermore, the extension of the amplitude spectra of the output traces to a higher-frequency band will be produced not only due to residual original signal components $\delta s_j(t)$, which are absent in the enhanced dataset, but also due to pure noise $\hat{n}_j(t)$. Despite this, Method 1 has practical value, particularly because cleanup of the phase spectra facilitates generating visible (yet contaminated) reflected events. In the absence of the reliable phase spectra derived in Method 1, seismic traces often remain obscured and invisible.

In order to improve an output dataset, the signal components must be improved. Additionally, the noise components must be suppressed. At the onset of processing the datasets, very little is known about the true distribution of the amplitude spectrum of the noise. Therefore, improving the output dataset is challenging. In order to improve the output dataset, the following assumptions are made at the onset of processing the datasets. First, the available information includes a rough signal estimation obtained from a data enhancement procedure. Second, the available information includes a reliable estimation of the phase spectra of the desired output signal. Third, the higher frequency components of the amplitude spectrum of the enhanced dataset may be suppressed. Methods 2 and 3 are based on these assumptions.

b. Method 2

In an embodiment, the second seismic processing method ("Method 2") uses a Time-Frequency Mask (TFM) for signal and noise separation when generating an output dataset. In particular, Method 2 uses the TFM to suppress the impact of noise presented in the amplitude spectra of the original dataset. Thus, Method 2 at least partially corrects the noise distortion in the amplitude spectra of the original dataset.

i. Overview of Time-Frequency Masks (TFMs)

TFMs preserve a signal contribution and suppress a noise contribution in the TF spectrum of a noisy signal. TFMs do so by operating with a simple real-valued function that is close to 1 in a "signal dominance" region of the TF spectrum and that is close to 0 in a "noise dominance" region. Applying a TFM to the noisy signal preserves the signal contribution as the signal contribution is multiplied by 1 and suppresses the noise contribution as the noise contribution is multiplied by 0.

In the frequency domain, a noisy signal spectrum is defined as a sum of an actual signal spectrum (that is, the signal contribution) and a noise spectrum (that is, the noise contribution):

$$X(\tau,v)=S(\tau,v)+N(\tau,v). \tag{12}$$

In equation (12), $X(\tau,v)$ represents the noisy signal spectrum; $S(\tau,v)$ represents the actual signal spectrum; and $N(\tau,v)$ represents the noise spectrum. To obtain an estimate of the actual signal spectrum, $\hat{S}(\tau,v)$, the noisy signal spectrum is multiplied by a real-valued TFM function:

$$\hat{S}(\tau,v)=M(\tau,v)\cdot X(\tau,v). \tag{13}$$

In equation (13), $M(\tau,v)$ is the real-valued TFM function. This step of applying the real-valued TFM to the noisy signal spectrum is referred to as noise suppression.

In practice, at least an approximate behavior of a signal power spectrum, a noise power spectrum, or both, must be known in order to construct a TFM. This is because many TFMs are defined by a relationship between the signal power spectrum, $|S(\tau,v)|^2$, and the noise power spectrum, $|N(\tau,v)|^2$.

There are different types of commercially available TFMs. A first type of TFM, called Ideal Binary Mask (IBM), is defined as:

$$IBM(\tau, v) = \begin{cases} 1, & \text{if } |S(\tau, v)|^2 > |N(\tau, v)|^2 \\ 0, & \text{else} \end{cases} \tag{14}$$

As shown by equation (14), the value of IBM is 1 where the signal power spectrum is greater than the noise power spectrum. Otherwise, the value of IBM is 0. A second type of TFM, called Ideal Rationale Mask (IRM), is defined as:

$$IBM(\tau, v) = \sqrt{\frac{|S(\tau, v)|^2}{|S(\tau, v)|^2 + |N(\tau, v)|^2}}. \tag{15}$$

As shown by equations (14) and (15), IBM and IRM vary in the interval [0 1]. A third type of TFM is called optimal ratio mask (ORM). This mask achieves optimal SNR gain over all other ratio masks. That is, the ORM provides the best SNR gain in comparison to the other described TFMs. Theoretical analysis has shown that ORM improves the SNR approximately $10 \log_{10} 2$ decibels (dB) over IRM, which is considered a simplified version of ORM. ORM is defined as:

$$ORM(\tau, v) = \frac{1}{2}\left[1 + \frac{|S(\tau, v)|^2 - |N(\tau, v)|^2}{|X(\tau, v)|^2}\right]. \tag{16}$$

By definition, $|X(\tau,v)|^2=|S(\tau,v)+N(\tau,v)|^2$. Furthermore, as shown by equations (14), (15), and (16), IBM, IRM, and ORM are power spectrum dependent only. That is, IBM, IRM, and ORM do not consider phase information of the noisy signal.

Some types of TFMs consider phase information of the noisy signal. A fourth type of TFM, called phase-sensitive mask (PSM), considers phase information of the noisy signal. PSM uses phase information to correct an amplitude spectrum of the noisy signal while leaving the phase spectrum untouched. PSM is defined as:

$$PSM(\tau, v) = \frac{|S(\tau, v)|}{|X(\tau, v)|}\cos(\varphi_S - \varphi_X). \tag{17}$$

In equation (17), $\varphi_s$ is the phase spectrum of the signal $S(\tau,v)$, and $\varphi_x$ is the phase spectrum of the noisy signal $X(\tau,v)$. Furthermore, as shown by equation (17), PSM varies in the interval [−1, 1].

ii. Description of Method 2

Given that TFMs can preserve a signal contribution and suppress a noise contribution in a noisy signal, it would be useful to apply TFMs when constructing an output trace in order to suppress the noise contribution in the original trace. As explained previously, at least an approximate behavior of a signal power spectrum, a noise power spectrum, or both, must be known in order to construct a TFM. However, unlike other types of signals, signal or noise estimates are not available in seismic prospecting. Therefore, TFMs, such as those previously described, cannot be directly used in seismic data processing.

In an embodiment, to counteract the unavailability of signal or noise estimates, Method 2 uses an enhanced trace to derive signal and noise estimates to construct TFMs. In particular, the enhanced trace is used as a "proxy," or estimate, of the desired output trace. And the difference between the original trace and the enhanced trace is used as an estimate of the noise contribution in the original trace. The enhanced trace and the noise estimate can then be used to construct TFMs. Specifically, the enhanced trace and the noise estimate are used to respectively calculate the signal power spectrum, $|S(\tau,v)|^2$, and the noise power spectrum, $|N(\tau,v)|^2$. The enhanced traces are used to replace $S(\tau,v)$ and the noise estimate is calculated as: $N(\tau,v)=X(k,l)-S(k,l)$.

However, because the enhanced trace and the noise contribution are approximations, part of the actual signal may leak into the noise estimate. Therefore, as shown by equation (3), the noise estimate may include an actual noise component and a residual signal component. It is challenging to separate and characterize the residual signal component that leaks into the noise estimate.

In an embodiment, TFMs are modified to account for the residual signal component that leaks into the noise estimate. In an implementation, TFMs are modified to include a noise threshold value, ε, that is designed to control the permissible power of noise in TFMs. In particular, the value of the noise threshold, which by definition is less than one (that is, ε<1), can increase or decrease the permissible power of noise. By introducing the noise threshold, even if the actual noise component and residual signal component in the noise estimate are not completely separated, some noise can be accepted in the noise estimate in exchange for preserving at least a portion of the residual signal component.

In an example, IRM is modified to include the noise threshold. The modified IRM (MIRM) is defined as:

$$MIRM(\tau, v) = \sqrt{\frac{|S(\tau, v)|^2}{|S(\tau, v)|^2 + \varepsilon |N(\tau, v)|^2}}, \varepsilon < 1. \tag{18}$$

In another example, ORM is modified to include the noise threshold. The modified MORM (MORM) is defined as:

$$MORM(\tau, v) = \frac{1}{2}\left[1 + \frac{|S(\tau, v)|^2 - \varepsilon |N(\tau, v)|^2}{|X(\tau, v)|^2}\right], \varepsilon < 1. \tag{19}$$

As shown in equations (18) and (19), the value of the noise threshold E varies between 0 and 1 and controls a degree of "noise passing." With intermediate values of E between 0 and 1, some amount of noise is passed. Specifically, smaller noise threshold values pass less noise, and greater noise threshold values pass more noise. In an implementation, the threshold value is defined by taking into account the tradeoff between high-frequency band preservation and signal-to-noise ratio improvement. That is, the fact that higher frequency band extension may be mainly obtained due to noise must be taken into consideration. Therefore, the value of the noise threshold is "case-specific" and can be established experimentally. In an example, the noise threshold has a default value of 0.5. In some implementations, the noise threshold is time-frame and frequency dependent. In such implementations, the expression for the threshold value is ε(τ,v). Time-frequency masking is a local and point-dependent procedure. As such, in principle, ε(τ,v) may be determined in each point of the time-frequency spectrum.

In another implementation, phase-sensitive TFMs are also modified. In a first example, PSM is combined with MIRM to form a phase-sensitive IRM that is defined as:

$$PSMIRM(\tau,v)=MIRM(\tau,v)\cdot\cos(\varphi_s-\varphi_x) \tag{20}$$

In a second example, PSM is combined with MORM to form a phase-sensitive ORM that is defined as:

$$PSMORM(\tau,v)=MORM(\tau,v)\cdot\cos(\varphi_s-\varphi_x). \tag{21}$$

In equations (20) and (21), $\varphi_X$, $\varphi_S$ are the phase spectra of the original and enhanced traces, respectively.

These modified TFMs can be used to generate an output trace with visible arrivals of reflected waves so that the amplitude spectrum of the trace is sufficiently expanded to higher frequencies. When using TFMs, the time-frequency masking is performed in a trace-by-trace manner (that is, single-channel processing).

In a first embodiment, a modified power spectrum dependent TFM (for example, MIRM or MORM) is applied to a noisy signal spectrum to suppress the noise component of the noisy signal spectrum, thereby generating an output dataset spectrum $\hat{S}(\tau,v)$. In particular, as shown in equation (15), the output spectrum is obtained by multiplying the noisy signal spectrum by a TFM function. Here, the noisy signal spectrum is the signal spectrum that is constructed from the original trace spectrum and the enhanced trace spectrum. Accordingly, the TF spectrum of the output dataset is represented by one of the following equations (depending on the choice of mask):

$$\hat{S}_j(k,l)=|X_j(k,l)|e^{i\varphi_s(k,l)}\cdot MIRM(k,l). \tag{22}$$

$$\hat{S}_j(k,l)=|X_j(k,l)|e^{i\varphi_s(k,l)}\cdot MORM(k,l). \tag{23}$$

In equations (22) and (23), $\hat{S}_j(k,l)$ is the TF spectrum of the j-th output trace, $|X_j(k,l)|$ is the TF amplitude spectrum of the j-th original trace, and $\varphi_s(k,l)$ is the TF phase spectrum of the corresponding j-th enhanced trace. Equation (22) uses MIRM as the TFM and equation (23) uses MORM as the TFM.

In a second embodiment, a phase-sensitive TFM is applied to a noisy signal spectrum to generate an output spectrum $\hat{S}(\tau,v)$. Unlike power or amplitude spectrum dependent TFMs, phase-sensitive TFMs are directly applied to the full complex TF spectrum of the original trace. Therefore, there is no direct enhanced phase spectrum implantation. Rather, the phase corrections are performed in the original phase spectrum by the phase-sensitive TFMs. Accordingly, the TF desired output spectra that are derived using the phase-sensitive TFMs are represented by one of the following equations (depending on the choice of mask):

$$\hat{S}_j(k,l)=X_j(k,l)\cdot PSMIRM(k,l). \tag{24}$$

$$\hat{S}_j(k,l)=X_j(k,l)\cdot PSMORM(k,l). \tag{25}$$

In equations (24) and (25), $X_j(k,l)$ is the full complex TF spectrum of original trace. Equation (24) uses PSMIRM as the TFM and equation (25) uses PSMORM as the TFM.

Figure 2:
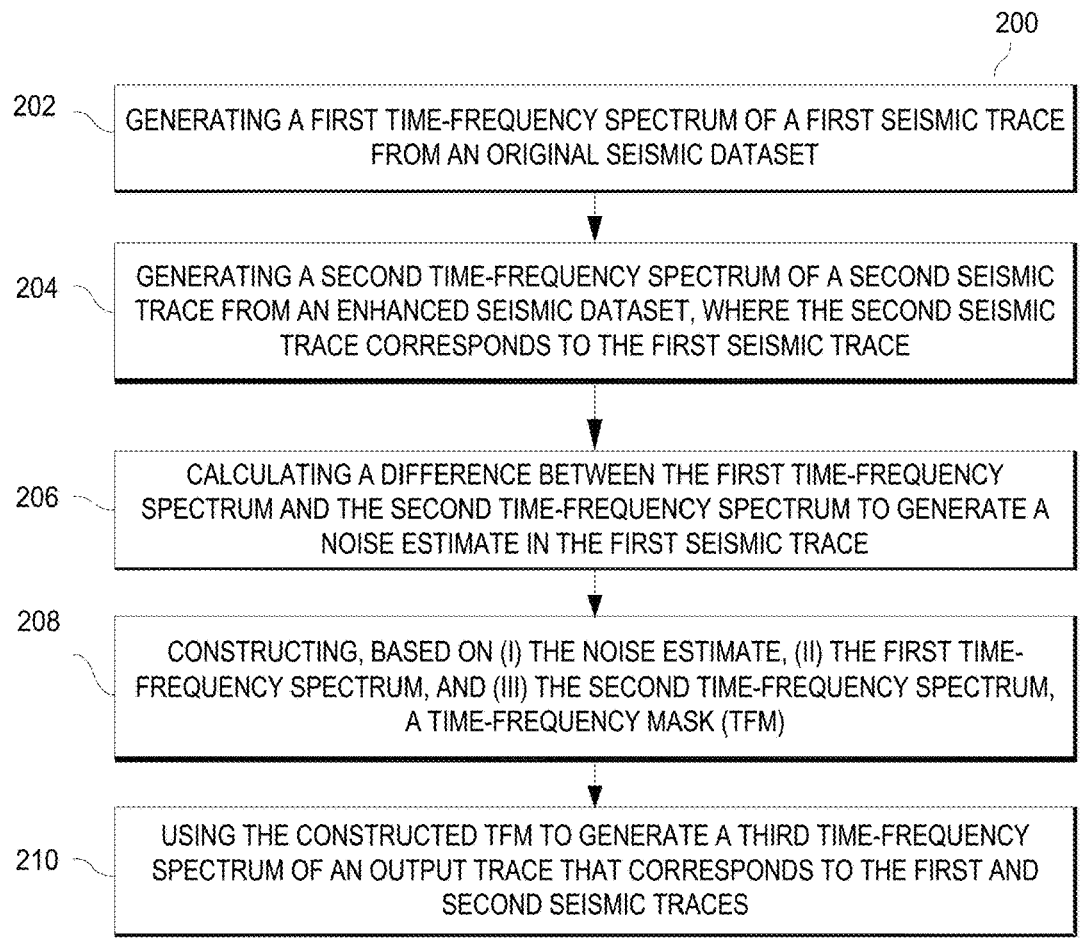
FIG. 2 is a flowchart of a second example seismic processing method, according to some implementations of the present disclosure.

FIG. 2 is a flow chart of an example method 200 for constructing a desired output trace, according to some implementations. For clarity of presentation, the description that follows generally describes method 200 in the context of the other figures in this description. For example, method 200 can be performed by a computer system described in FIG. 10. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At step 202, method 200 involves generating a first time-frequency spectrum of a first seismic trace from an original seismic dataset. The original seismic dataset is a dataset of seismic traces that has been obtained by performing a seismic survey (for example, seismic survey illustrated in FIG. 9). In some examples, the original seismic dataset has passed through a standard seismic signal processing workflow that includes processes such as noise removal, static correction, and deconvolution. Therefore, the original seismic dataset is ready for velocity analysis and imaging. Performing the time-frequency transformation on the first seismic trace from the original seismic dataset generates a time-frequency spectrum of the first seismic trace. In an example, the time-frequency transformation is performed using short-time Fourier transform (STFT).

At step 204, method 200 involves generating a second time-frequency spectrum of a second seismic trace from an enhanced seismic dataset, wherein the second seismic trace corresponds to the first seismic trace. In an implementation, the enhanced dataset is generated by applying an SNR enhancement procedure to the original seismic dataset. The enhanced dataset retains the same acquisition geometry as the original dataset. Therefore, the second seismic trace, which corresponds to the first seismic signal, is located at the same position in the enhanced dataset as the position of the first seismic trace in the original seismic dataset. Furthermore, the enhanced dataset has improved SNR in comparison to the original dataset. However, the high-frequency content of the enhanced dataset is suppressed due to suboptimal stacking during the SNR enhancement procedure.

At step 206, method 200 involves calculating a difference between the first time-frequency spectrum and the second time-frequency spectrum to generate a noise estimate in the first seismic trace. This calculation is represented by equation (26):

$$N_j(k,l)=X_j(k,l)-S_j(k,l). \tag{26}$$

The noise estimate includes an actual noise component and a suppressed residual component of the signal.

At step 208, method 200 involves constructing, based on (i) the noise estimate, (ii) the first time-frequency spectrum, and (iii) the second time-frequency spectrum, a time-frequency mask (TFM). In one implementation, the constructed TFM is a power spectrum dependent TFM, such as MIRM and MORM. In another implementation, the constructed TFM is a phase-sensitive TFM, such as PSMIRM and PSMORM.

At step 210, method 200 involves using the constructed TFM to generate a third time-frequency spectrum of an output trace that corresponds to the first and second seismic traces. In a first example, the constructed TFM is a MIRM. In this example, using the constructed TFM to generate the output seismic trace involves determining the value of MIRM. Determining the value of MIRM involves determining whether the absolute value of the amplitude spectrum of the original signal is equal to zero ($|X_j(k,l)|=0$). If the absolute value of the amplitude spectrum is equal to zero, then MIRM is set equal to one. Otherwise, if the absolute value of the amplitude spectrum of the original signal is not equal to zero ($|X_j(k,l)|\neq 0$), then MIRM is calculated according to equation (18). Once the value of MIRM is determined, the output trace is generated according to equation (22). For simplicity, the version of Method 2 that uses MIRM as the TFM is referred to as Method 2.1.

In a second example, the constructed TFM is a MORM. In this example, using the constructed TFM to generate the output seismic trace involves determining the value of MORM. Determining the value of MORM involves whether the absolute value of the amplitude spectrum of the original signal is equal to zero ($|X_j(k,l)|=0$). If the absolute value of the amplitude spectrum is equal to zero, then MORM is set equal to one. Otherwise, if the absolute value of the amplitude spectrum of the original signal is not equal to zero ($|X_j(k,l)|\neq 0$), then it is determined whether the absolute value of the amplitude spectrum of the noise estimate is less than or equal to the absolute value of the amplitude spectrum ($|N_j(k,l)|\leq |X_j(k,l)|$). If the absolute value of the amplitude spectrum of the noise estimate is less than or equal to the absolute value of the amplitude spectrum, then the value of MORM is calculated according to equation (19). Otherwise, if the absolute value of the amplitude spectrum of the noise estimate is not less than or equal to the absolute value of the amplitude spectrum, then the value of MORM is equal to the ratio of the amplitude spectrum of the enhanced trace to the amplitude spectrum of the original trace:

$$MORM(k,l) = \frac{|S_j(k,l)|}{|X_j(k,l)|}. \tag{27}$$

Once the value of MORM is determined, the output trace is generated according to equation (23). For simplicity, the version of Method 2 that uses MORM as the TFM is referred to as Method 2.2.

In a third example, the constructed TFM is a PSMIRM. In this example, using the constructed TFM to generate the output seismic trace involves determining the value of PSMIRM. Determining the value of PSMIRM involves determining whether the absolute value of the amplitude spectrum of the original signal is equal to zero ($|X_j(k,l)|=0$). If the absolute value of the amplitude spectrum is equal to zero, then PSMIRM is set equal to one. Otherwise, if the absolute value of the amplitude spectrum of the original signal is not equal to zero ($|X_j(k,l)|\neq 0$), then the value of PSMIRM is calculated according to equation (20). Once the value of PSMIRM is determined, the output trace is generated according to equation (24). For simplicity, the version of Method 2 that uses PSMIRM as the TFM is referred to as Method 2.3.

In a fourth example, the constructed TFM is a PSMORM. In this example, using the constructed TFM to generate the output seismic trace involves determining the value of PSMORM. Determining the value of PSMORM involves whether the absolute value of the amplitude spectrum of the original signal is equal to zero ($|X_j(k,l)|=0$). If the absolute value of the amplitude spectrum is equal to zero, then PSMORM is set equal to one. Otherwise, if the absolute value of the amplitude spectrum of the original signal is not equal to zero ($|X_j(k,l)|\neq 0$), then it is determined whether the absolute value of the amplitude spectrum of the noise estimate is less than or equal to the absolute value of the amplitude spectrum ($|N_j(k,l)|\leq |X_j(k,l)|$). If the absolute value of the amplitude spectrum of the noise estimate is less than or equal to the absolute value of the amplitude spectrum, then the value of PSMORM is calculated according to equation (21). Otherwise, if the absolute value of the amplitude spectrum of the noise estimate is not less than or equal to the absolute value of the amplitude spectrum, then the value of PSMORM is equal to the ratio of the amplitude spectrum of the enhanced trace to the amplitude spectrum of the original trace. Once the value of MORM is determined, the output trace is generated according to equation (25). For simplicity, the version of Method 2 that uses MORM as the TFM is referred to as Method 2.4.

In an implementation, once step 210 is completed, method 200 involves repeating steps 202-210 for one or more other traces in the original seismic dataset. The output traces are then arranged together to form an output dataset. The amplitude spectra of the output dataset includes higher frequencies than the amplitude spectra of the enhanced dataset. Additionally, the frequency band of the output dataset is wider than the frequency band of the enhanced dataset. Furthermore, the output dataset preserves the SNR enhancement found in the enhanced dataset. Thus, the output dataset combines the wide frequency band of the original dataset with the SNR enhancement of the enhanced dataset. Additionally, application of TFMs reduces identified noises that remain untouched in Method 1.

Furthermore, in some implementations, method 200 also involves performing ISTFT on the TF spectrum of the output trace to generate a time domain version of the output trace. The ISTFT can be performed on each output trace individually once the trace is generated or can be performed on the output traces once the output dataset is generated.

c. Method 3

As explained previously, the noise component of an original trace is defined as the difference between the original trace and a corresponding enhanced trace. As also explained, this noise estimate includes both an actual noise component and a residual component of the actual signal that has been suppressed due to suboptimal stacking. In an embodiment, the third method ("Method 3") involves estimating the actual noise component in the original traces. The estimate of the actual noise component is used to generate a TFM that is then used to construct an output trace.

In an embodiment, the noise component, $n_j(t)$, is characterized as White Gaussian Noise (WGN). In this embodiment, the level of WGN is nearly identical within each time interval of a trace under consideration. By characterizing the noise component as WGN, the high-amplitude outliers in $n_j(t)$ that are due to imperfect subtraction of coherent arrivals representing parts of the leaked signal can be removed. To do so, it is presumed that the level of WGN is less than peak amplitudes of desired arrivals. In an implementation, the high-amplitude outliers are removed by taking the median of the difference between noisy and enhanced traces (instead of using the full distribution of noise). In an example, a median filter is used to take the median difference between the noisy and enhanced traces.

Method 3 includes two stages: a noise estimation stage and a TF masking stage. The second stage is performed in analogy with Method 2, with one modification: the TF spectra of noise $\hat{N}_j(k,l)$ is calculated as discrete STFT (DSTFT) of "noise" estimated during the noise estimation stage (as opposed to the difference of TF spectra of an original trace and an enhanced trace as was done in Method 2).

In the noise estimation stage, the noise component is calculated as $n_j(t)=x_j(t)-s_j(t)$. Then, the TF spectrum of the noise component, $N_j(k,l)$, is generated using STFT. Once $N_j(k,l)$ is generated, a respective median value of the respective amplitude spectrum at each frequency in the noise spectrum is calculated:

$$M(k) = \underset{l}{\text{median}}\ |N_j(k, l)|. \tag{28}$$

In equation (28), k is the frequency and j is the trace number. Once the respective median value at each frequency is calculated, a TF spectrum of a refined noise estimate is calculated as:

$$\hat{N}_j(k,l)=M(k)\cdot e^{i\varphi_N(k,l)}. \tag{29}$$

In equation (29), $\hat{N}_j(k,l)$ is the TF spectrum of the refined noise estimate and $\varphi_N$ is the phase spectrum of the initial noise estimate. In this example, the noise component is characterized as WGN. However, other methods for single-channel noise estimation are possible and contemplated.

In the TF masking stage, the refined noise estimate is used to generate a TFM. In an implementation, methods 2.1, 2.2, 2.3, and 2.4 are modified to introduce the refined noise estimate so that the TFMs are generated using the refined noise estimate. In particular, the refined noise estimate, $\hat{n}_j(t)$, replaces the initial noise estimate, $n_j(t)$. The modified methods are referred to as methods 3.1, 3.2, 3.3, and 3.4, respectively.

Figure 3:
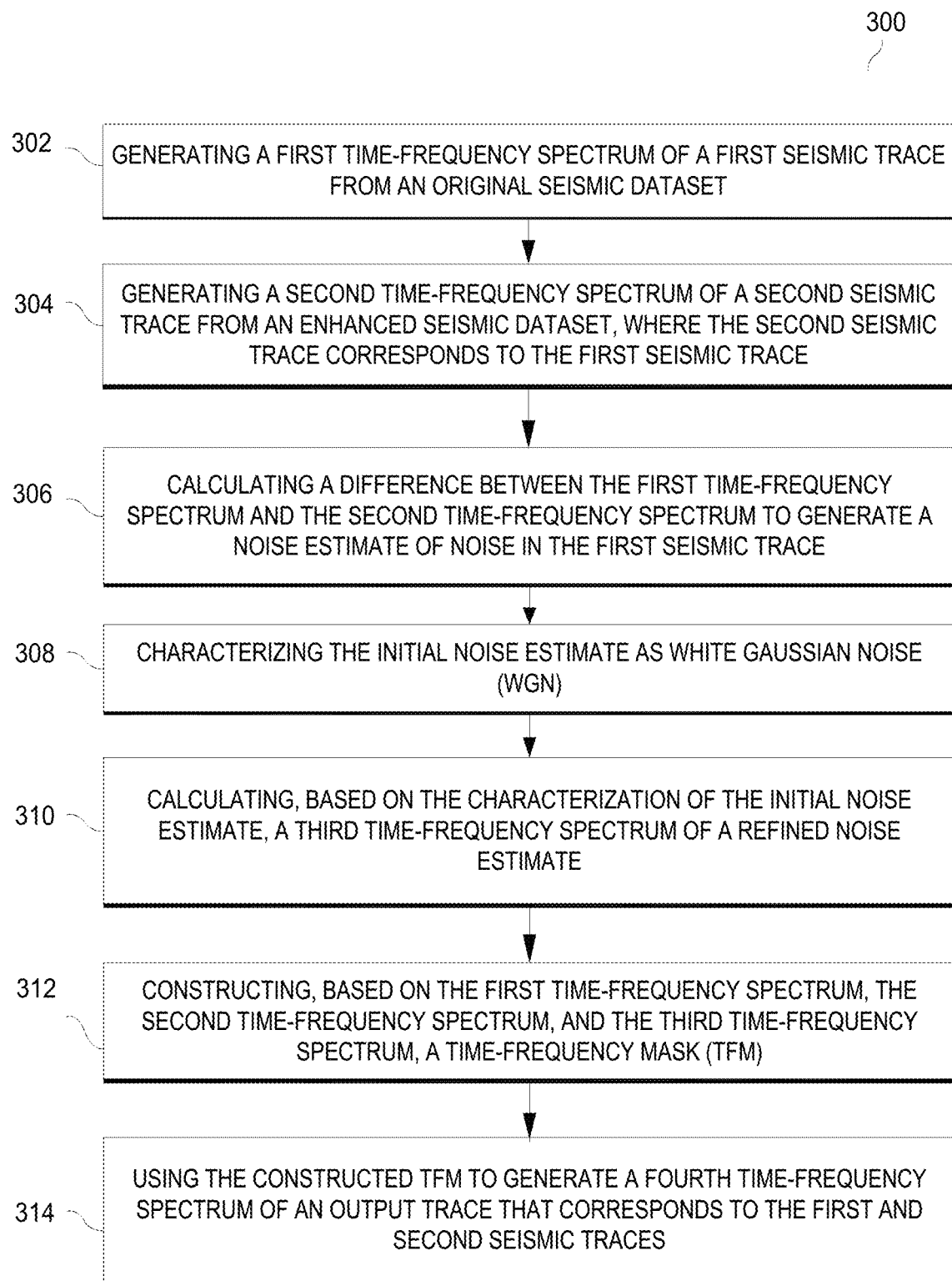
FIG. 3 is a flowchart of a third example seismic processing method, according to some implementations of the present disclosure.

FIG. 3 is a flow chart of an example method 300 for constructing a desired output trace, according to some implementations. For clarity of presentation, the description that follows generally describes method 300 in the context of the other figures in this description. For example, method 300 can be performed by a computer system described in FIG. 10. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At step 302, method 300 involves generating a first time-frequency spectrum of a first seismic trace from an original seismic dataset. The original seismic dataset is a dataset of seismic traces that has been obtained by performing a seismic survey (for example, seismic survey illustrated in FIG. 9). In some examples, the original seismic dataset has passed through a standard seismic signal processing workflow that includes processes such as noise removal, static correction, and deconvolution. Therefore, the original seismic dataset is ready for velocity analysis and imaging. Performing the time-frequency transformation on the first seismic trace from the original seismic dataset generates a time-frequency spectrum of the first seismic trace. In an example, the time-frequency transformation is performed using short-time Fourier transform (STFT).

At step 304, method 300 involves generating a second time-frequency spectrum of a second seismic trace from an enhanced seismic dataset, where the second seismic trace corresponds to the first seismic trace. In an implementation, the enhanced dataset is generated by applying an SNR enhancement procedure to the original seismic dataset. The enhanced dataset retains the same acquisition geometry as the original dataset. Therefore, the second seismic trace, which corresponds to the first seismic signal, is located at the same position in the enhanced dataset as the position of the first seismic trace in the original seismic dataset. Furthermore, the enhanced dataset has improved SNR in comparison to the original dataset. However, the high-frequency content of the enhanced dataset is suppressed due to suboptimal stacking during the SNR enhancement procedure.

At step 306, method 300 involves calculating a difference between the first time-frequency spectrum and the second time-frequency spectrum to generate a noise estimate of noise in the first seismic trace.

At step 308, method 300 involves characterizing the initial noise estimate as White Gaussian Noise (WGN).

At step 310, method 300 involves calculating, based on the characterization of the initial noise estimate, a third time-frequency spectrum of a refined noise estimate. Calculating, based on the characterization of the initial noise estimate, a refined noise estimate includes: for each frequency in the initial noise estimate, calculating a respective median of an amplitude spectrum of the initial noise estimate at that frequency. Additionally, the calculating includes coupling each respective median of the amplitude spectrum and a corresponding respective phase spectrum of the initial noise to generate the time-frequency spectrum of the refined noise estimate.

At step 312, method 300 involves constructing, based on the first time-frequency spectrum, the second time-frequency spectrum, and the third time-frequency spectrum, a time-frequency mask (TFM).

At step 314, method 300 involves using the constructed TFM to generate a fourth time-frequency spectrum of an output trace that corresponds to the first and second seismic traces.

II. Real Data Examples

FIGS. 4A-4D illustrate an example of the disclosed two-step process applied to a seismic trace, according to some implementations. In this example, the two-step process is applied to the seismic dataset in order to improve the SNR of the seismic dataset while preserving high-frequency content of the dataset. In the first step, non-linear beamforming (NLBF) is used to obtain an enhanced trace from the original trace. In the second step, Method 2 is used to generate the output trace.

Figure 4A:
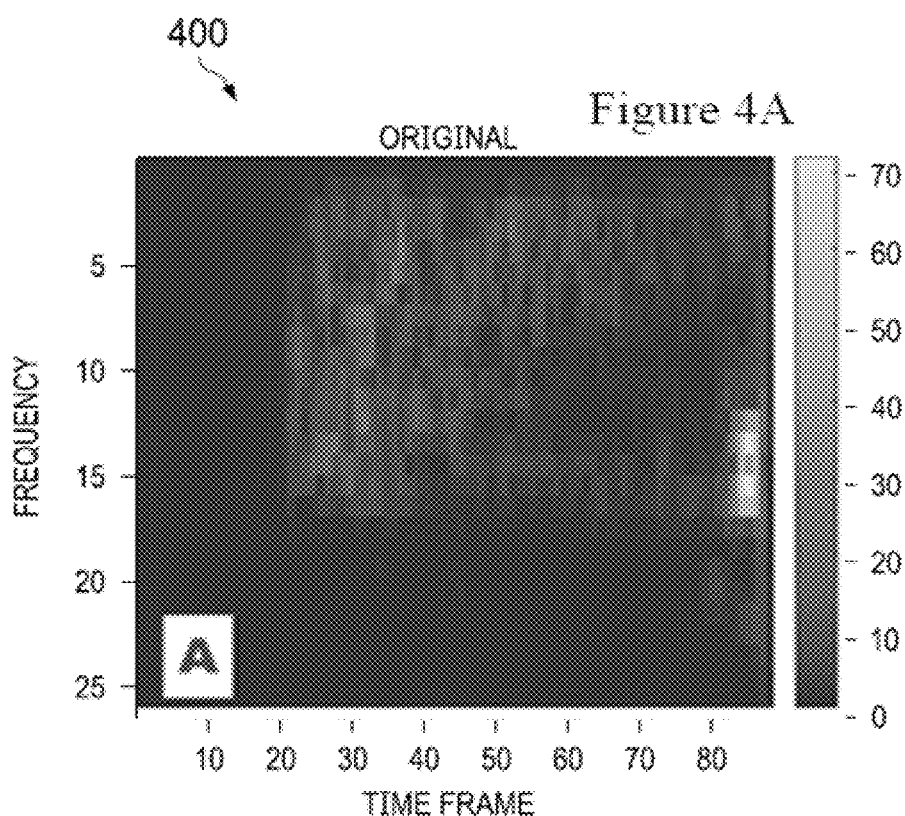
FIGS. 4A, 4B, 4C, and 4D illustrate an example of a seismic processing method applied to a seismic trace, according to some implementations of the present disclosure.

FIG. 4A illustrates a time-frequency spectrum 400 of an original seismic trace. The time-frequency spectrum 400 is generated by using STFT to transform the original trace from the time domain to the time-frequency spectrum domain. As shown in FIG. 4A, the time-frequency spectrum 400 is a three-dimensional (3D) representation of the original trace. As shown in FIG. 4A, the frequency information in the original trace is weak and there is little decipherable information.

Figure 4B:
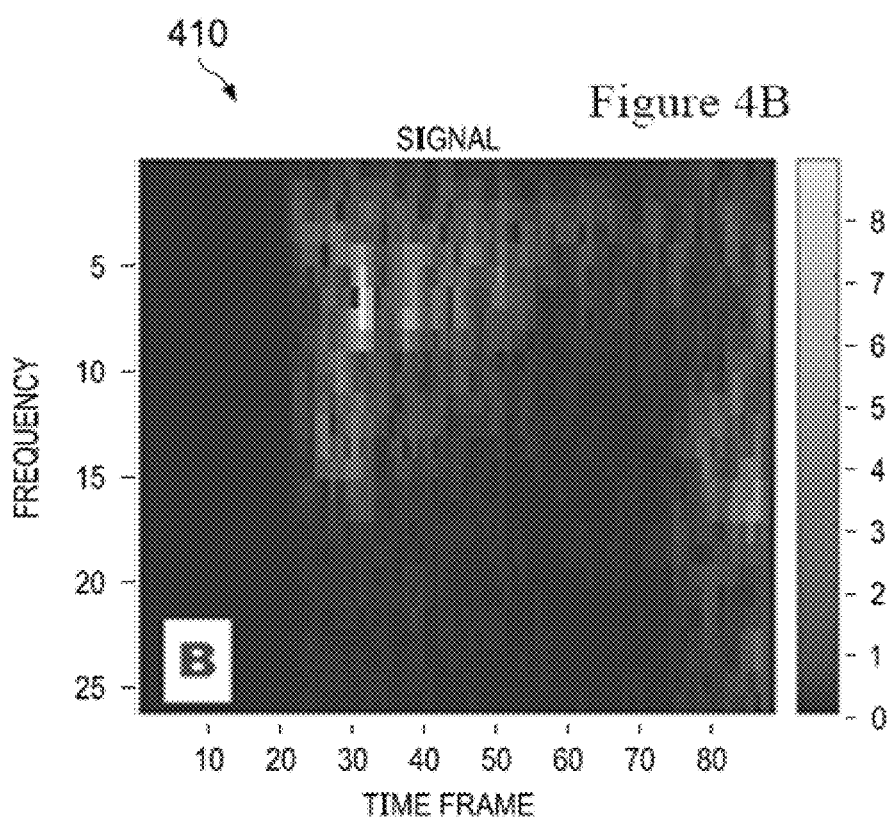

FIG. 4B illustrates a time-frequency spectrum 410 of an enhanced seismic trace that is generated by applying an SNR enhancement procedure to the original trace. In particular, a non-linear beamforming (NLBF) process is applied to the original trace in order to generate the enhanced trace. As described previously, the SNR enhancement procedure improves the signal-to-noise ratio of the original trace. However, as shown in FIG. 4B, although the quality of the signal improves in lower frequencies, the high-frequency content of the signal is suppressed. For example, amplitudes at frequencies in the range of 5-10 Hertz (Hz) experience significant uplift and enhancement. However, as also shown by comparing FIGS. 4A and 4B, that signal is suppressed in the frequency range 15-20 Hz.

Figure 4C:
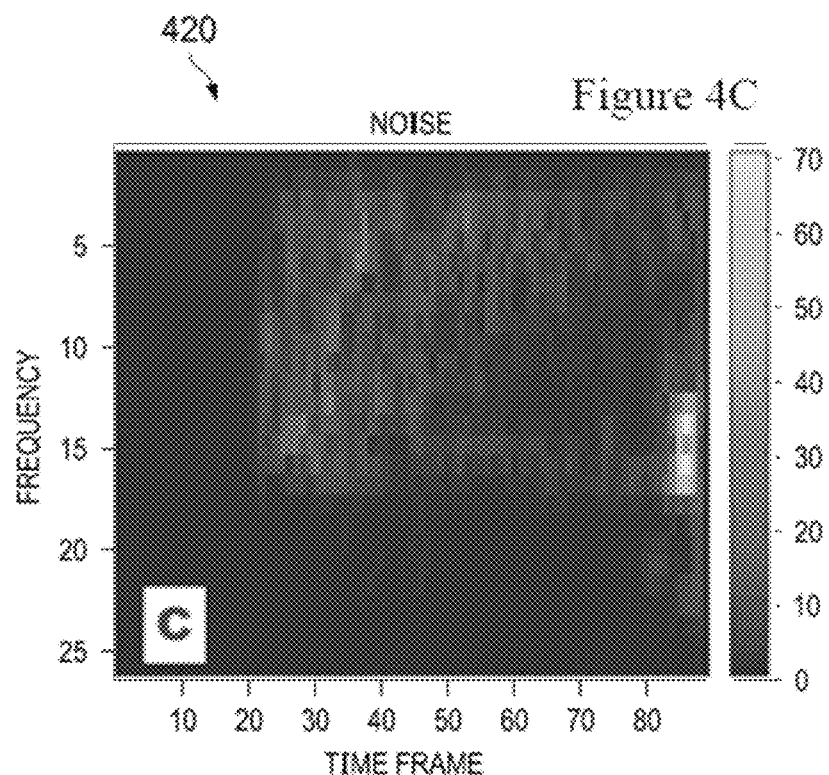

FIG. 4C illustrates a time-frequency spectrum 420 of an estimate of the noise in the original trace. In this example, the noise estimate is generated by calculating the difference between the original trace and the enhanced trace.

Figure 4D:
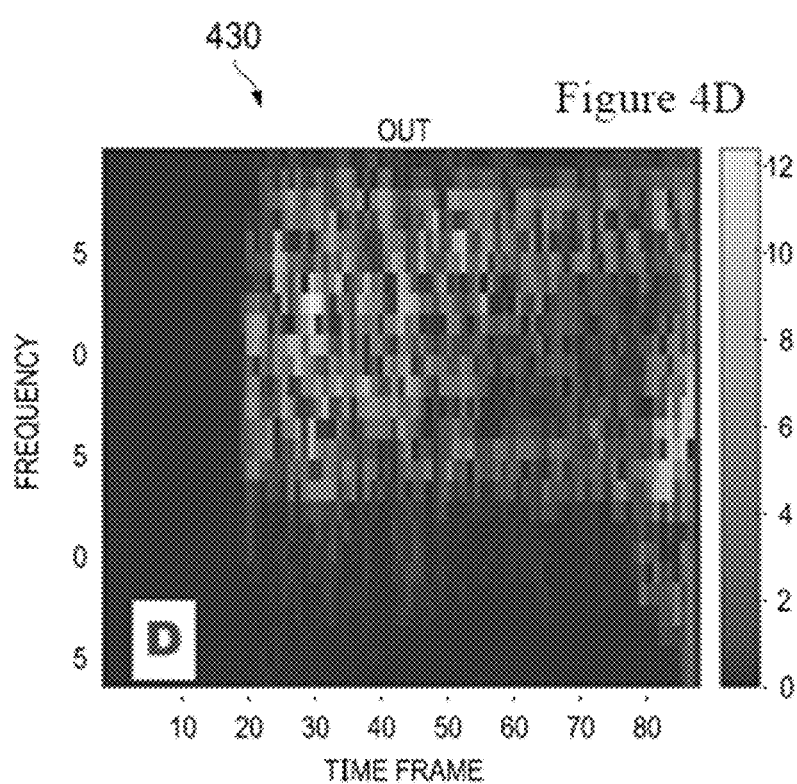

FIG. 4D illustrates a time-frequency spectrum 430 of an output trace that is generated using the original trace, the enhanced trace, and the noise estimate. In this example, the output seismic trace used Method 2.3. That is, PSMIRM is used as the TFM in this application of Method 2. As shown by comparing FIG. 4D to FIGS. 4A-4B, the output trace has improved SNR compared to the original trace while preserving the high-frequency content.

FIGS. 5A-5C illustrate an example application of the disclosed two-step process to a seismic dataset. In this example, non-linear beamforming (NLBF) is used in the first stage, and Method 1 is used in the second stage.

FIG. 5A illustrates an original dataset 500 in the time domain. In this example, the original dataset 500 is a common-midpoint (CMP) gather that is obtained from a three-dimensional (3D) land dataset. Additionally, the original dataset 500 has passed through a standard processing workflow. Therefore, the original dataset 500 is ready for velocity analysis and imaging. As shown in FIG. 5A, the prestack signal is weak and there are no visible reflections in the gather.

FIG. 5B illustrates an enhanced dataset 510 that is generated by applying an SNR enhancement procedure to the original dataset 500. In this example, a non-linear beamforming (NLBF) method is applied to the original dataset 500 to generate the enhanced seismic dataset 510. Furthermore, in this example, the NLBF data enhancement is performed with summation apertures 150 meters×150 meters in the CMP and offset dimensions. Approximately 200 neighboring traces are used in the local summation to enhance each trace in the original dataset. As shown in FIG. 5B, after the applying the enhancement procedure, the reflections are recognizable in the entire offset range. However, the high-frequency content of the gather is suppressed due to suboptimal stacking. This is shown in FIG. 5B by the strong, but overly smoothed, reflections.

FIG. 5C illustrates a first output dataset 520 that is generated using the original dataset 500 and the enhanced dataset 510 as building blocks. In this example, Method 1 is used to generate the output dataset 520.

FIG. 5D illustrates a second output dataset 530 that is also generated using the original dataset 500 and the enhanced dataset 510 as building blocks. In this example, Method 3.3 is used to generate the second output dataset 530. As described previously, PSMIRM is used as the TFM in Method 3.3.

FIG. 5E illustrates a third output dataset 540 that is also generated using the original dataset 500 and the enhanced dataset 510 as building blocks. In this example, Method 3.2 is used to generate the output dataset 540. As described previously, MORM is used as the TFM in Method 3.2.

As shown in FIGS. 5C, 5D, and 5E, the reflections, which are still visible in the entire offset range, remain resolved with more details in comparison to the enhanced dataset 510. As also shown in these figures, sharp time shifts between neighboring traces are clearly distinguishable most likely preserving static corrections due to variable near surface conditions (unlike FIG. 5B where events are overly smoothed and such static corrections cannot be recovered any more).

Figure 6A:
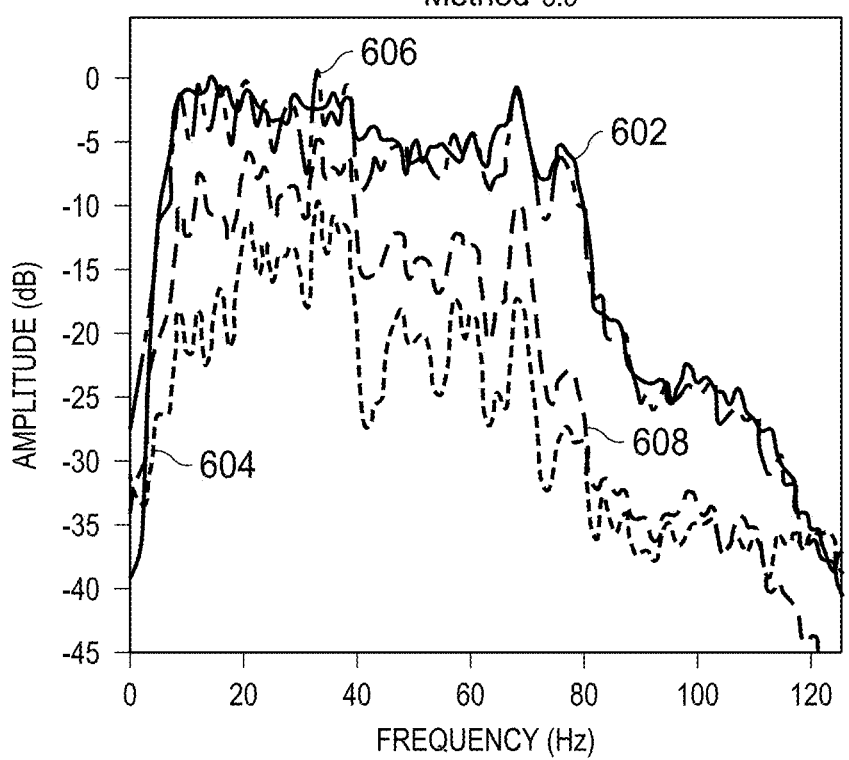
FIGS. 6A and 6B each illustrate a comparison of averaged amplitude spectra of an original dataset, an enhanced dataset, and output datasets, according to some implementations of the present disclosure.
Figure 6B:
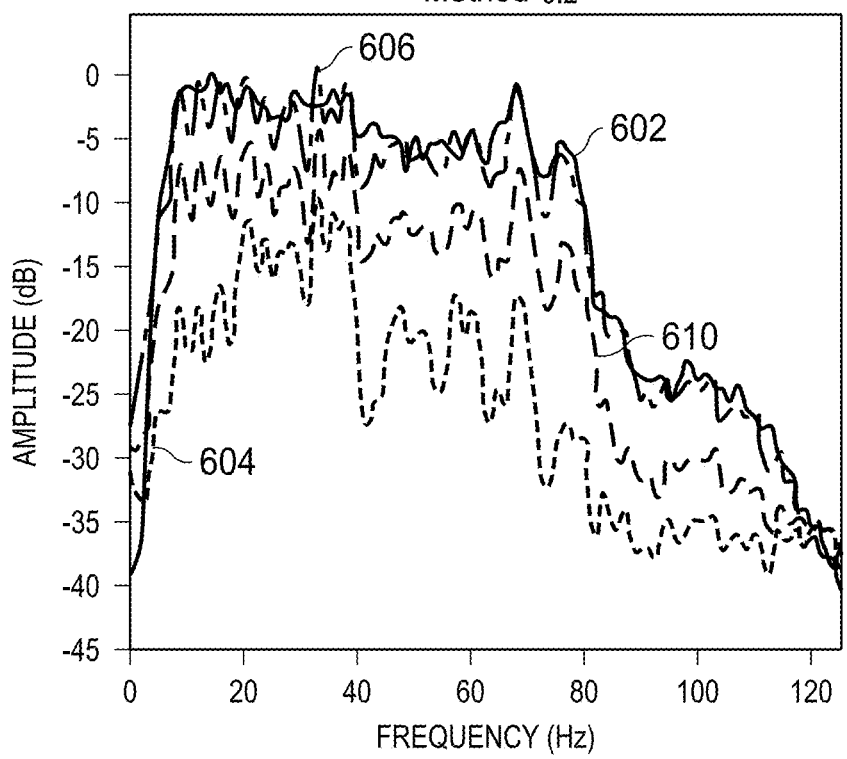

FIGS. 6A and 6B each illustrate a comparison of averaged amplitude spectra of an original dataset, an enhanced dataset, and output datasets, according to some implementations. Specifically, the averaged amplitude spectra are calculated in the time window [0.5, 3.5] seconds. In this example, the averaged amplitude spectra are constructed using a stacked trace (for example, a stack of 10 nearby traces in offset direction). Stacked traces are used to stabilize the results: variations on a single trace would be larger, whereas on stacked trace, variations would be smaller and desired trends in amplitude behavior are more easily identified.

FIGS. 6A and 6B each illustrate an original data spectrum 602, an enhanced data spectrum 604, and an output data spectrum 606 that is generated using Method 1. FIG. 6A also illustrates an output data spectrum 608 that is generated using Method 3.3, and FIG. 6B also illustrates an output data spectrum 610 that is generated using Method 3.2. The computed amplitude spectra validate that introduced corrections using the disclosed methods led to preservation of higher frequencies in the data. In these examples, a 200 millisecond (ms) time window is used for STFT and the noise threshold $\varepsilon$ is chosen as $\varepsilon=0.5$.

Figure 7B:
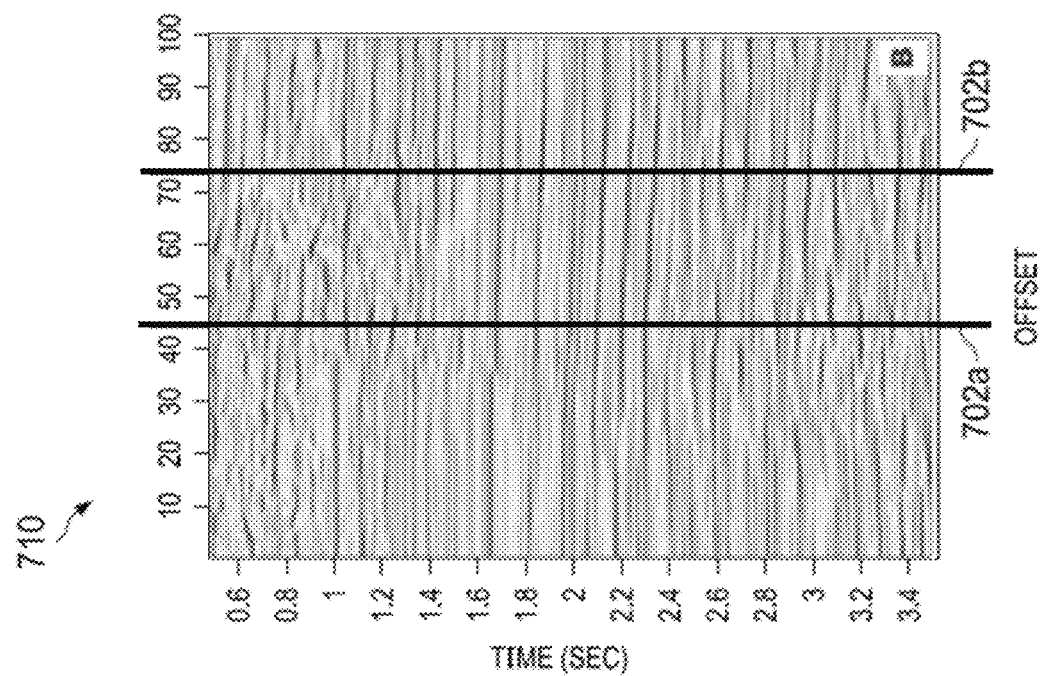
FIGS. 7A, 7B, and 7C illustrate an original dataset stack, an enhanced dataset stack, and an output dataset stack, according to some implementations of the present disclosure.
Figure 7A:
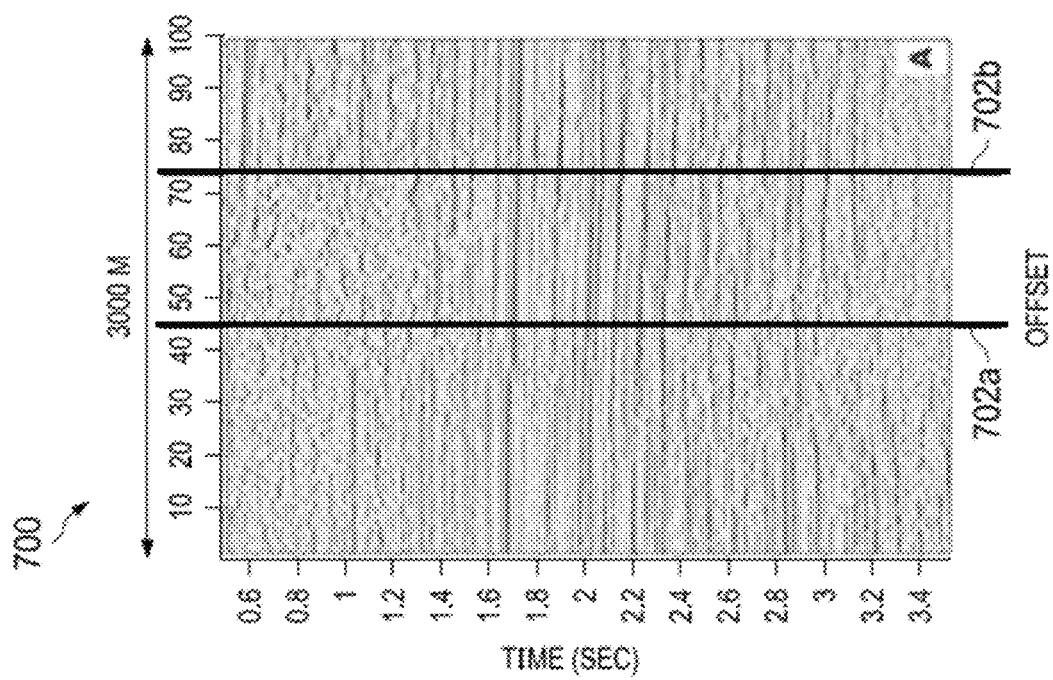
Figure 7C:
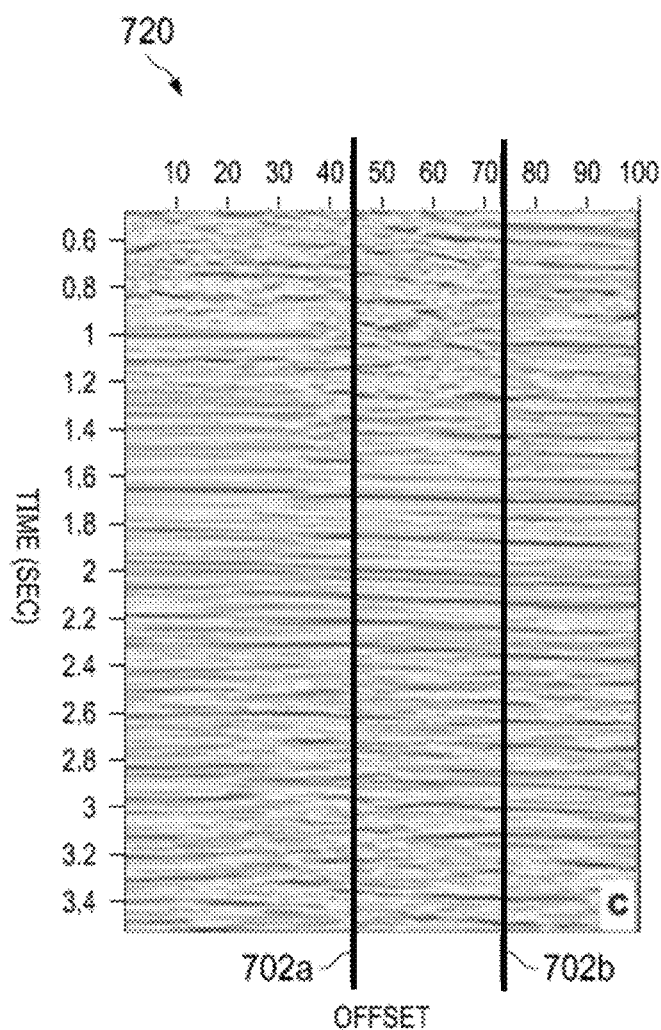

FIGS. 7A-7C illustrate fragments of stack/time image sections generated using original, enhanced, and output data, according to some implementations. In particular, FIG. 7A illustrates a stack 700 of original data, FIG. 7B illustrates a stack 710 of enhanced data (after NLBF), and FIG. 7C illustrates a stack 720 of output data that is generated using Method 3.3. The prestack data of the stack 720 is shown in FIG. 5D. Comparison of the stacks illustrates that while the enhanced stack 710 has better event continuity in the challenging data area (located between lines 702a, 702b), the stacks 710 and 720 possess finer spatial and temporal details.

Figure 8:
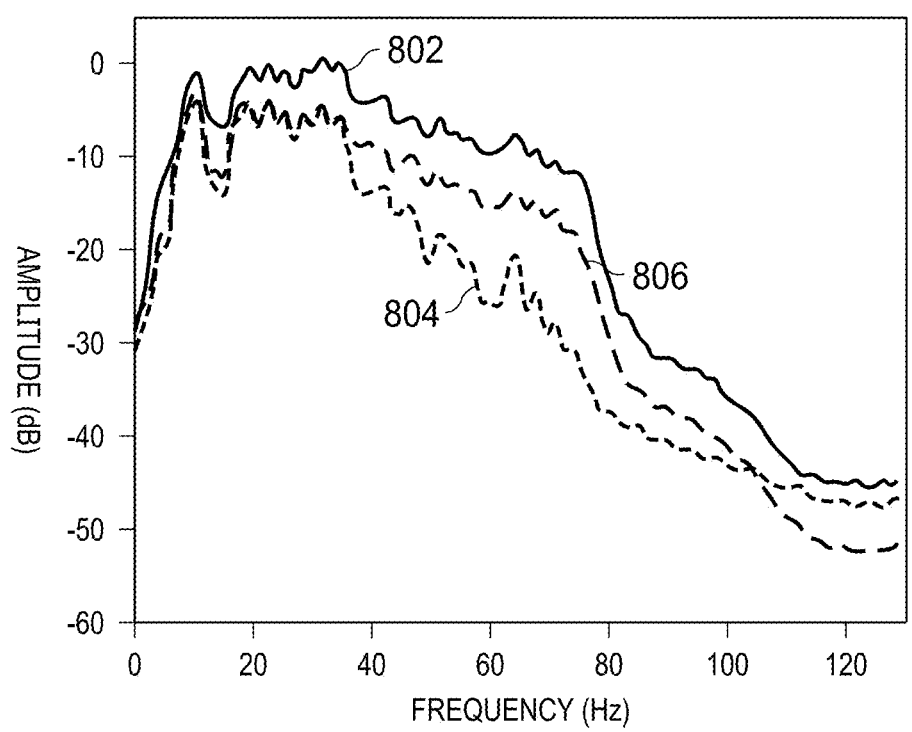
FIG. 8 illustrates a comparison of averaged amplitude spectra of an original dataset stack, an enhanced dataset stack, and an output dataset stack, according to some implementations of the present disclosure.

FIG. 8 illustrates a comparison of averaged amplitude spectra of an original stack, an enhanced stack, and an output stack, according to some implementations. Specifically, the averaged amplitude spectra are calculated in the time window [0.5, 3.5] seconds in zero-offset stack sections. FIG. 8 illustrates an original stack spectrum 802, an enhanced stack spectrum 804, and an output stack spectrum 806 that is generated using Method 3.3. As shown by the output stack spectrum 806, higher frequencies appear after stacking than in prestack data (shown in FIGS. 6A and 6B). This indicates that additional signal is gained on prestack records that coherently added up during the imaging step. Therefore, it can be concluded that amplitude spectra corrections provide significant uplift in prestack and post-stack images obtained with challenging seismic data.

IV. Example Seismic Survey

Figure 9:
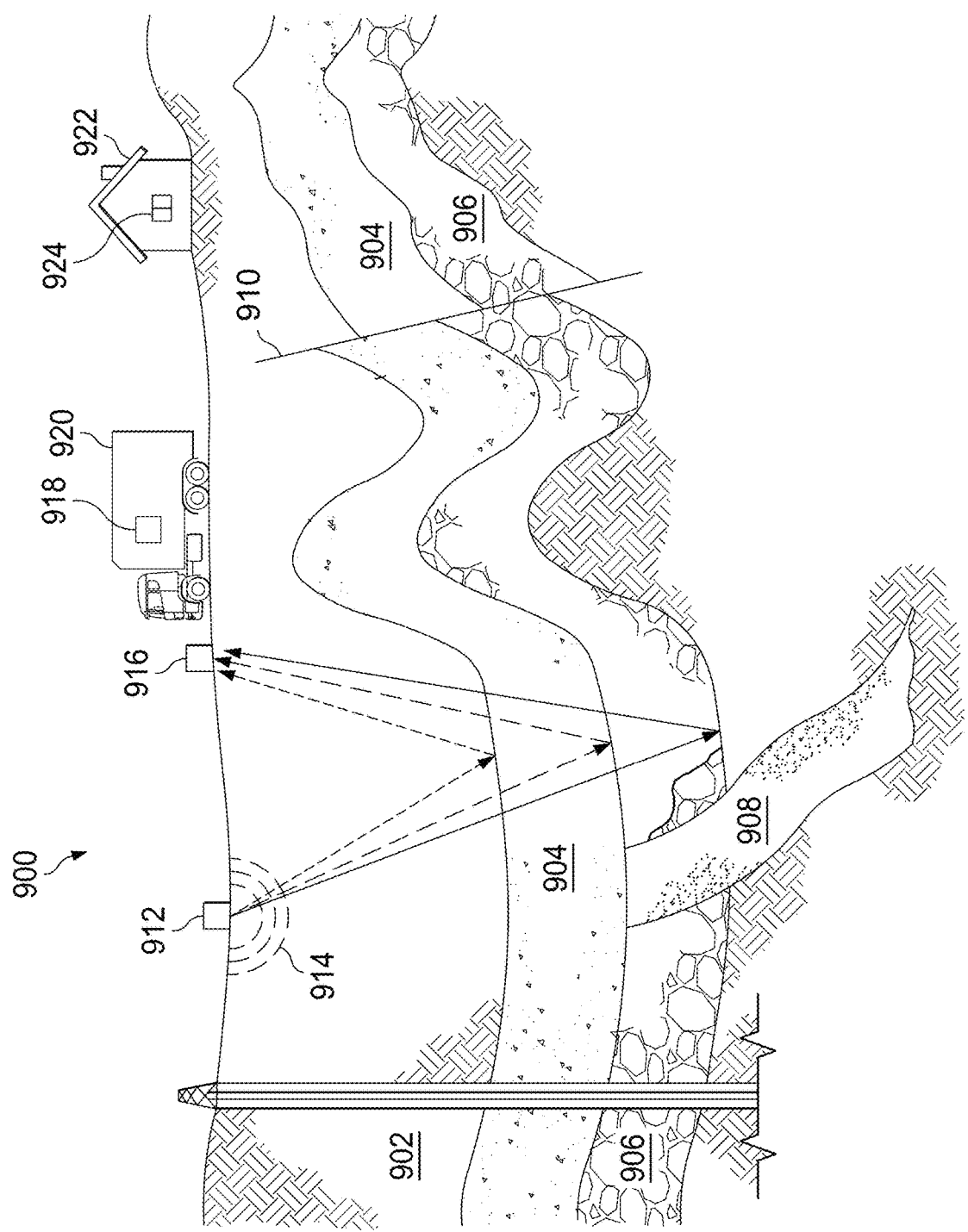
FIG. 9 illustrates an example seismic survey, according to some implementations of the present disclosure.

FIG. 9 is a schematic view of a seismic survey being performed to map subterranean features such as facies and faults in a subterranean formation 900. The subterranean formation 900 includes a layer of impermeable cap rocks 902 at the surface. Facies underlying the impermeable cap rocks 902 include a sandstone layer 904, a limestone layer 906, and a sand layer 908. A fault line 910 extends across the sandstone layer 904 and the limestone layer 906.

A seismic source 912 (for example, a seismic vibrator or an explosion) generates seismic waves 914 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 900, the velocity of seismic waves traveling through the subterranean formation 900 will be different in the sandstone layer 904, the limestone layer 906, and the sand layer 908. As the seismic waves 914 contact interfaces between geologic bodies or layers that have different velocities, the interface reflects some of the energy of the seismic wave and refracts part of the energy of the seismic wave. Such interfaces are sometimes referred to as horizons.

The seismic waves 914 are received by a sensor or sensors 916. Although illustrated as a single component in FIG. 1, the sensor or sensors 916 are typically a line or an array of sensors 916 that generate an output signal in response to received seismic waves including waves reflected by the horizons in the subterranean formation 900. The sensor or sensors 916 can be geophone-receivers that produce electrical output signals transmitted as input data, for example, to a computer 918 on a seismic control truck 920. Based on the input data, the computer 918 may generate a seismic data output such as, for example, a seismic two-way response time plot.

A control center 922 can be operatively coupled to the seismic control truck 920 and other data acquisition and wellsite systems. The control center 922 may have computer facilities for receiving, storing, processing, and analyzing data from the seismic control truck 920 and other data acquisition and wellsite systems. For example, computer systems 924 in the control center 922 can be configured to analyze, model, control, optimize, or perform management tasks of field operations associated with development and production of resources such as oil and gas from the subterranean formation 900. Alternatively, the computer systems 924 can be located in a different location than the control center 922. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 924 may be displayed for user viewing using local or remote monitors or other display units. One approach to analyzing seismic data is to associate the data with portions of a seismic cube representing the subterranean formation 900. The seismic cube can also display results of the analysis of the seismic data associated with the seismic survey.

V. Example Computer System

Figure 10:
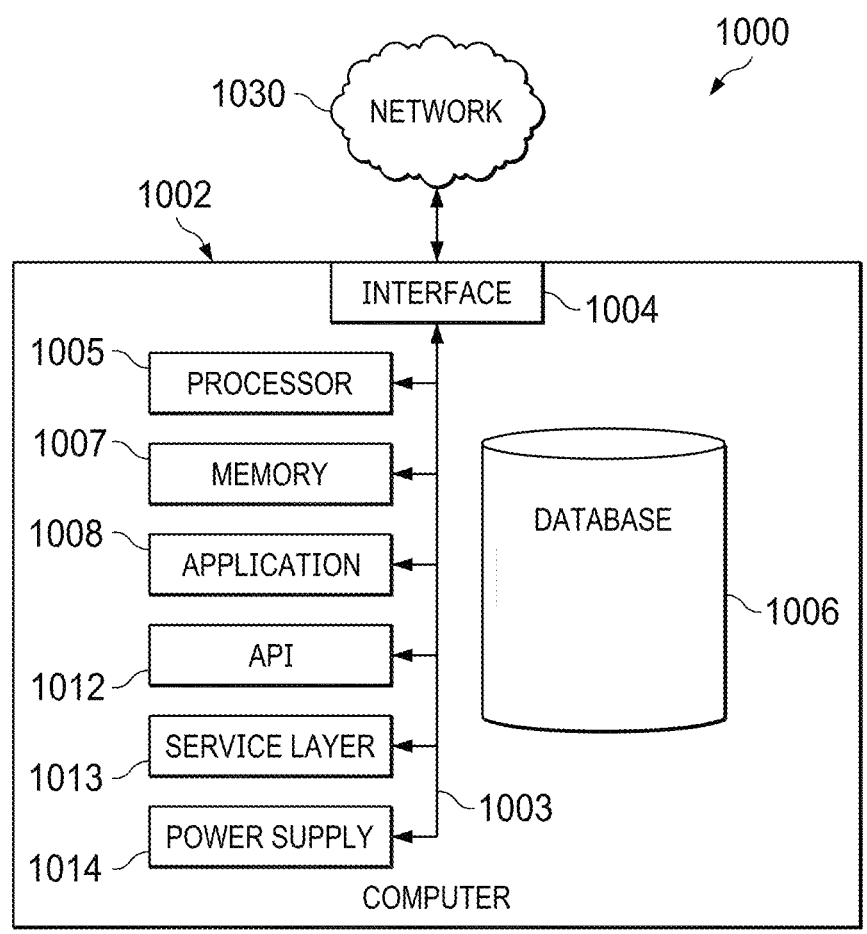
FIG. 10 is a block diagram of an example computer system used to provide computational functionalities associated with described algorithms, methods, functions, processes, flows, and procedures, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both), over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030, or the interface's hardware, can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002, and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic disks, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tapes, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure

We claim:

1. A method comprising:
   generating a first time-frequency spectrum of a first seismic trace from an original seismic dataset received from a plurality of sensors, the original seismic dataset comprising a plurality of seismic signals of a wellsite subterranean region;
   generating a second time-frequency spectrum of a second seismic trace from a signal to noise ratio filtered seismic dataset, wherein the second seismic trace suppresses a noise component of the original seismic dataset;
   combining an amplitude spectrum of the first time-frequency spectrum and a phase spectrum of the second time-frequency spectrum, for each discrete frequency bin, and frame index, to generate a third time-frequency spectrum of an output trace, the third time-frequency spectrum of the output trace comprising time shifts between neighboring traces differentiating the plurality of seismic signals that integrates noise masked data from the first and second seismic traces; and controlling wellsite systems, using the third time-frequency spectrum, to perform field operations.

2. The method of claim 1, further comprising:
generating a time-based output trace from the third time-frequency spectrum.

3. The method of claim 2, wherein generating the first time-frequency spectrum comprises using short-term Fourier transform (STFT) to generate the first time-frequency spectrum, and wherein generating the time-based output trace comprises using inverse short-term Fourier transform (ISTFT) to generate the time-based output trace.

4. The method of claim 1, wherein the signal to noise ratio filtered seismic dataset is generated by performing a signal-to-noise ratio (SNR) enhancement procedure on the original seismic dataset.

5. The method of claim 4, wherein the SNR enhancement procedure comprises: common-reflection surface method (CRS), multi-focusing (MF), supergrouping, or non-linear beamforming.

6. The method of claim 1, wherein the signal to noise ratio filtered seismic dataset has an identical acquisition geometry to the original seismic dataset, and wherein the second seismic trace is located in the same position in the signal to noise ratio filtered seismic dataset as the first seismic trace in the original seismic dataset.

7. The method of claim 1, wherein the original seismic dataset comprises a plurality of seismic traces, the method further comprising:
for each seismic trace of the plurality, generating a respective output trace corresponding to the seismic trace, wherein the respective output traces collectively form an output seismic dataset.

8. A device comprising:
one or more processors; and
a non-transitory computer-readable storage medium coupled to the one or more processors and storing programming instructions for execution by the one or more processors, the programming instructions instructing the one or more processors to perform operations comprising:
generating a first time-frequency spectrum of a first seismic trace from an original seismic dataset received from a plurality of sensors, the original seismic dataset comprising a plurality of seismic signals of a wellsite subterranean region;
generating a second time-frequency spectrum of a second seismic trace from a signal to noise ratio filtered seismic dataset, wherein the second seismic trace suppresses a noise component of the original seismic dataset;
combining an amplitude spectrum of the first time-frequency spectrum and a phase spectrum of the second time-frequency spectrum, for each discrete frequency bin, and frame index, to generate a third time-frequency spectrum of an output trace, the third time-frequency spectrum of the output trace comprising time shifts between neighboring traces differentiating the plurality of seismic signals that integrates noise masked data from the first and second seismic traces; and
controlling wellsite systems, using the third time-frequency spectrum, to perform field operations.

9. The device of claim 8, the operations further comprising:
generating a time-based output trace from the third time-frequency spectrum.

10. The device of claim 9, wherein generating the first time-frequency spectrum comprises using short-term Fourier transform (STFT) to generate the first time-frequency spectrum, and wherein generating the time-based output trace comprises using inverse short-term Fourier transform (ISTFT) to generate the time-based output trace.

11. The device of claim 8, wherein the signal to noise ratio filtered seismic dataset is generated by performing a signal-to-noise ratio (SNR) enhancement procedure on the original seismic dataset.

12. The device of claim 11, wherein the SNR enhancement procedure comprises: common-reflection surface method (CRS), multi-focusing (MF), supergrouping, or non-linear beamforming.

13. The device of claim 8, wherein the signal to noise ratio filtered seismic dataset has an identical acquisition geometry to the original seismic dataset, and wherein the second seismic trace is located in the same position in the signal to noise ratio filtered seismic dataset as the first seismic trace in the original seismic dataset.

14. The device of claim 8, wherein the original seismic dataset comprises a plurality of seismic traces, and wherein the operations further comprise:
for each seismic trace of the plurality, generating a respective output trace corresponding to the seismic trace, wherein the respective output traces collectively form an output seismic dataset.

15. A non-transitory computer-readable medium storing instructions executable by a computer system to perform operations comprising:
generating a first time-frequency spectrum of a first seismic trace from an original seismic dataset received from a plurality of sensors, the original seismic dataset comprising a plurality of seismic signals of a wellsite subterranean region;
generating a second time-frequency spectrum of a second seismic trace from a signal to noise ratio filtered seismic dataset, wherein the second seismic trace suppresses a noise component of the original seismic dataset;
combining an amplitude spectrum of the first time-frequency spectrum and a phase spectrum of the second time-frequency spectrum, for each discrete frequency bin, and frame index, to generate a third time-frequency spectrum of an output trace, the third time-frequency spectrum of the output trace comprising time shifts between neighboring traces differentiating the plurality of seismic signals that integrates noise masked data from the first and second seismic traces; and
controlling wellsite systems, using the third time-frequency spectrum, to perform field operations.

16. The non-transitory computer-readable medium of claim 15, the operations further comprising:
generating a time-based output trace from the third time-frequency spectrum.

17. The non-transitory computer-readable medium of claim 16, wherein generating the first time-frequency spectrum comprises using short-term Fourier transform (STFT) to generate the first time-frequency spectrum, and wherein generating the time-based output trace comprises using inverse short-term Fourier transform (ISTFT) to generate the time-based output trace.

18. The non-transitory computer-readable medium of claim 15, wherein the signal to noise ratio filtered seismic dataset is generated by performing a signal-to-noise ratio (SNR) enhancement procedure on the original seismic dataset.

19. The non-transitory computer-readable medium of claim 18, wherein the SNR enhancement procedure comprises: common-reflection surface method (CRS), multi-focusing (MF), supergrouping, or non-linear beamforming.

20. The non-transitory computer-readable medium of claim 15, wherein the signal to noise ratio filtered seismic dataset has an identical acquisition geometry to the original seismic dataset, and wherein the second seismic trace is located in the same position in the signal to noise ratio filtered seismic dataset as the first seismic trace in the original seismic dataset.

* * * * *